(12) United States Patent
Ise et al.

(10) Patent No.: US 9,307,335 B2
(45) Date of Patent: Apr. 5, 2016

(54) DEVICE FOR ESTIMATING PLACEMENT OF PHYSICAL OBJECTS

(71) Applicant: Japan Science and Technology Agency, Kawaguchi-shi, Saitama (JP)

(72) Inventors: Shiro Ise, Inzai (JP); Kayo Matsuoka, Kasugai (JP)

(73) Assignee: JAPAN SCIENCE AND TECHNOLOGY AGENCY, Kawaguchi-Shi (JP)

( * ) Notice: Subject to any disclaimer, the term of this patent is extended or adjusted under 35 U.S.C. 154(b) by 94 days.

(21) Appl. No.: 14/370,859

(22) PCT Filed: Jan. 30, 2013

(86) PCT No.: PCT/JP2013/052066
§ 371 (c)(1),
(2) Date: Jul. 7, 2014

(87) PCT Pub. No.: WO2014/020921
PCT Pub. Date: Feb. 6, 2014

(65) Prior Publication Data
US 2015/0003631 A1  Jan. 1, 2015

(30) Foreign Application Priority Data
Jul. 31, 2012 (JP) ................................. 2012-169602

(51) Int. Cl.
*H04R 3/00* (2006.01)
*H04R 29/00* (2006.01)
(Continued)

(52) U.S. Cl.
CPC . *H04R 29/00* (2013.01); *G01S 5/18* (2013.01); *G01S 5/30* (2013.01); *H04R 1/403* (2013.01);
(Continued)

(58) Field of Classification Search
None
See application file for complete search history.

(56) References Cited

U.S. PATENT DOCUMENTS 5,515,853 A  5/1996  Smith et al.
5,742,745 A  4/1998  Sugikawa et al.
(Continued)

FOREIGN PATENT DOCUMENTS

JP  H08-070305 A  3/1996
JP  2006-300861 A  11/2006
(Continued)

OTHER PUBLICATIONS

Stanley T. Birchfield, Member, IEEE, and Amarnag Subramanya, "Microphone Array Position Calibration by Basis-Point Classical Multidimensional Scaling," IEEE Transactions on Speech and Audio Processing, vol. 13, No. 5, pp. 1025-1034 (2005).
(Continued)

*Primary Examiner* — Thang Tran

(57) ABSTRACT

An object position estimating apparatus which estimates positions of M objects in real space (M being an integer not less than 2), including: a characteristic vector generating unit operable to generate, for each of M objects, a characteristic vector, the characteristic vector including as its components measurements of the object measured on N scales (N being an integer not less than 3), each of N scales measuring closeness to each of N reference points in the real space; a dissimilarity matrix deriving unit operable to calculate a norm between the characteristic vectors of two objects for every pair from among M objects and to derive a dissimilarity matrix with M rows and M columns, the dissimilarity matrix including as its elements the calculated norms; and an estimation unit operable to estimate positions of M objects in the real space based on the dissimilarity matrix and to output an estimation result.

15 Claims, 31 Drawing Sheets

(51) Int. Cl.
  *G01S 5/18* (2006.01)
  *H04R 3/12* (2006.01)
  *H04R 1/40* (2006.01)
  *H04S 7/00* (2006.01)
  *G01S 5/30* (2006.01)

(52) U.S. Cl.
  CPC ............... *H04R 1/406* (2013.01); *H04R 3/12* (2013.01); *H04S 7/301* (2013.01); *H04R 2201/40* (2013.01); *H04S 2400/11* (2013.01)

(56) References Cited

U.S. PATENT DOCUMENTS

| | | | |
|---|---|---|---|
| 5,949,772 | A | 9/1999 | Sugikawa et al. |
| 2002/0167862 | A1 | 11/2002 | Tomasi |
| 2005/0216258 | A1* | 9/2005 | Kobayashi .......... G10L 21/0364 704/205 |
| 2008/0008333 | A1* | 1/2008 | Nishikawa ............ H04M 9/082 381/94.3 |
| 2008/0316863 | A1* | 12/2008 | Walley .................... G01S 7/412 367/135 |
| 2010/0014685 | A1* | 1/2010 | Wurm .................. G10K 11/178 381/71.11 |
| 2010/0027805 | A1* | 2/2010 | Itou ...................... G10K 11/178 381/71.12 |
| 2010/0195444 | A1 | 8/2010 | Choisel et al. |
| 2011/0103191 | A1* | 5/2011 | Shin ...................... G01S 3/8006 367/125 |
| 2013/0142342 | A1* | 6/2013 | Del Galdo ............. H04R 3/005 381/56 |
| 2014/0192999 | A1* | 7/2014 | Sannino ................. H04R 3/005 381/92 |

FOREIGN PATENT DOCUMENTS

| | | |
|---|---|---|
| JP | 2008-064568 A | 3/2008 |
| WO | 2009/010832 A1 | 1/2009 |

OTHER PUBLICATIONS

Vikas C. Raykar, Igor Kozintsev, and Rainer Lienhart, "Position Calibration of Microphones and Loudspeakers in Distributed Computing Platforms," IEEE Transactions on Speech and Audio Processing, vol. 13, No. 1, pp. 70-83 (2005).

Alessandro Redondi, Marco Tagliasacchi, Fabio Antonacci, and Augusto Sart!, "Geometric Calibration of Distributed Microphone Arrays," MMSP '09, Oct. 5-7, 2009, Rio de Janeiro, Brazil, IEEE.

Kazunori Kobayashi, Ken'Ichi Furuya, and Akitoshi Kataoka, "A Blind Source Localization by Using Freely Positioned Microphones," Journal of the Institute of Electronics, Information, and Communication Engineers, vol. J86-A, No. 6, pp. 619-627 (2003).

The International Bureau of WIPO, International Preliminary Report on Patentability, received for PCT Patent Application No. PCT/JP2013/052066, mailed on Feb. 12, 2015, 7 pages.

European Patent Office, "Extended European Search Report," issued in European Patent Application No. 13 825 770.4, which is a European counterpart of U.S. Appl. No. 14/370,859, with an issuance date of Nov. 11, 2015, 11 pages.

Lu Y et al., "PD detection and localisation by acoustic measurements in an oil-filled transformer", IEE Proceedings: Science, Measurement and Technology, IEE, Stevenage, Herts, GB, vol. 147, No. 2, Mar. 3, 2000, pp. 81-85, XP006014483, ISSN: 1350-2344, Doi: 10.1049/IP-SMT:20000223.

Chee-Hyun Park et al., "Squared Range Weighted Least Squares Source Localization Based on the Element-Wise and Vector-Wise Orthogonality Principles", IEICE Transactions on Communications, Communications Society, Tokyo, JP, vol. E92B, No. 12, Dec. 1, 2009, pp. 3972-3975, XP001552478, ISSN: 0916-8516, DOI: 10.1587/transcom. E92.B.3972.

\* cited by examiner

DEVICE FOR ESTIMATING PLACEMENT OF PHYSICAL OBJECTS

CROSS REFERENCE TO RELATED APPLICATIONS

This patent application is a U.S. national stage application under 35 U.S.C. §371 of International Patent Application No. PCT/JP2013/052066 filed on Jan. 30, 2013, which claims the benefit of foreign priority to Japanese Patent Application No. JP 2012-169602 filed on Jul. 31, 2012, the disclosures of all of which are hereby incorporated by reference in their entireties. The International Application was published in Japanese on Feb. 6, 2014, as International Publication No. WO 2014/020921 A1 under PCT Article 21(2).

TECHNICAL FIELD

The present invention relates to an object position estimating apparatus, and particularly to the object position estimating apparatus which estimates positions of a plurality of objects.

BACKGROUND ART

Recently, a system utilizing a multichannel sound field recording and reproduction system has come under the spotlight. The system provides a vivid presence sound field. A variety of systems such as: a 2ch stereo-sound system; a binaural system; a 5.1ch surround-sound system, each of which uses relatively few channels, and; a 22.2 multichannel sound system; and a 121ch microphone array/157ch loudspeaker array system using advanced technology developed from the principle of Ambisonics, each of which uses relatively many channels, has already been proposed.

When recording a sound field with the system mentioned above, one has to check an arrangement of tens of microphones and cable-connections between the microphones and a sound recording device at the site of recording. By the same token, when reproducing a sound field with the system mentioned above, one also has to check the arrangement of tens of loudspeakers and cable-connections between the loudspeakers and a sound reproduction device at the site of reproduction.

Accordingly, an apparatus with which one can easily check the arrangement of a number of microphones (or a number of loudspeakers) and cable-connections is anticipated.

Patent Literature 1 (US2010/0195444A Specification) discloses a method for estimating positions of a plurality of loudspeakers. In the method of Patent Literature 1, with respect to the plurality of loudspeakers regarded as position estimation objects, distances of every pair among the loudspeakers are measured. Based on the measurement result, a distance matrix of which each element shows a distance of a loudspeaker pair in real space is derived. In the method of Patent Literature 1, then, the Multidimensional Scaling is applied to the distance matrix derived as mentioned above to obtain the positions in the real space of the plurality of the loud speakers.

CITATION LIST

Patent Literature

PTL 1: US2010/0195444A1 Specification

Non Patent Literature

NPL 1: Vikas C. Raykar, Igor Kozintsev and Rainer Lienhart, Position Calibration of Microphones and Loudspeakers in Distributed Computing Platforms, IEEE Transactions On Speech And Audio Processing, p. 1-12.

NPL 2: Stanley T. Birchfield, Amarnag Subramanya, Microphone Array Position Calibration by Basis-Point Classical Multidimensional Scaling, IEEE Transactions On Speech And Audio Processing, Vol. 13, No. 5, September 2005, p. 1025-1034.

NPL 3: Alessandro Redondi, Marco Tagliasacchi, Fabio Antonacci, Augusto Sarti, Geometric calibration of distributed microphone arrays, MMSP '09, Oct. 5-7, 2009, Rio de Janeiro, Brazil, IEEE.

NPL 4: Kazunori Kobayashi, Ken'ichi Furuya, Akitoshi Kataoka, A Blind Source Localization by Using Freely Positioned Microphones, Institute of Electronics, Information, and Communication Engineers, The Transactions of the Institute of Electronics, Information and Communication Engineers A, Vol. J86-A, No. 6, p. 619-627.

SUMMARY OF INVENTION

Technical Problem

In the conventional art, however, distances in the real space of all pairs of position estimation objects (all pairs of a plurality of loudspeakers in Patent Literature 1, for example) are measured, and then, based on the measurement result, a distance matrix is derived. The distance matrix has elements each of which is the distance in the real space between the paired loudspeakers. The Multidimensional Scaling is applied to the distance matrix derived as mentioned above, equated with a matrix of position estimation object's (dis-)similarity, so that the positions in the real space of the plurality of the loudspeakers are obtained. The number of distances to be measured increases as the number of the position estimation objects increases. For this, it makes hard to estimate the positions. Further, the possibility of an estimation error due to a measurement error will grow as the number of the position estimation objects increases. Furthermore, in certain cases, it is not as easy to measure the distances between the position estimation objects precisely as in the case described in Patent Literature 1. The conventional art has failed to provide easy-and-precise object position estimation.

Considering the problems mentioned above, each embodiment of the present invention provides an apparatus that estimates positions in the real space of a plurality of objects easier and more precisely than the conventional art.

Solution to Problem

A first aspect of the present invention is an object position estimating apparatus which estimates positions of M objects (M being an integer greater than or equal to 2) in real space. The apparatus includes: a characteristic vector generating unit operable to generate, for each of the M objects, a characteristic vector, the characteristic vector including as its components measurements of the object measured on N scales (N being an integer greater than or equal to 3), each of the N scales measuring closeness to each of N reference points in the real space; a dissimilarity matrix deriving unit operable to calculate a norm between the characteristic vectors of two objects for every pair from among the M objects and to derive a dissimilarity matrix with M rows and M columns, the dissimilarity matrix including as its elements the calculated norms; and an estimation unit operable to estimate positions of the M objects in the real space on the basis of the dissimilarity matrix and to output an estimation result.

A second aspect of the present invention is an object position estimation method for estimating positions of M objects (M being an integer greater than or equal to 2) in real space by an object position estimating apparatus which estimates the positions of the objects. The method includes: generating, for each of the M objects, a characteristic vector, the characteristic vector including as its components measurements of the object measured on N scales (N being an integer greater than or equal to 3), each of the N scales measuring closeness to each of N reference points in the real space; deriving a dissimilarity matrix with M rows and M columns by calculating a norm between the characteristic vectors of two objects for every pair from among the M objects, the dissimilarity matrix including as its elements the calculated norms; and estimating the positions of the M objects in the real space on the basis of the dissimilarity matrix and outputting an estimation result.

A third aspect of the present invention is an object position estimation program which causes a computer to perform functions of an object position estimating apparatus which estimates positions of M objects (M being an integer greater than or equal to 2) in real space. The program causes the computer to function as: a characteristic vector generating unit operable to generate, for each of the M objects, a characteristic vector, the characteristic vector including as its components measurements of the object measured on N scales (N being an integer greater than or equal to 3), each of the N scales measuring closeness to each of N reference points in the real space; a dissimilarity matrix deriving unit operable to calculate a norm between the characteristic vectors of two objects for every pair from among the M objects and to derive a dissimilarity matrix with M rows and M columns, the dissimilarity matrix including as its elements the calculated norms; and an estimation unit operable to estimate the positions of the M objects in the real space on the basis of the dissimilarity matrix and to output an estimation result.

Advantageous Effects of Invention

The object position estimating apparatus according to embodiments of the present invention: generates, for each of the M objects, a characteristic vector including measurements of the object measured on N scales (N: an integer greater than or equal to 3) as its components, each of the N scales measuring closeness to each of N reference points in the real space; calculates a norm between the characteristic vectors of two objects for every pair from among the M objects to derive a dissimilarity matrix with M rows and M columns, the dissimilarity matrix including as its elements the calculated norms; and estimates the positions of the M objects in the real space on the basis of the dissimilarity matrix and outputs an estimation result. In this manner, the object position estimating apparatus is capable of estimating positions of objects more easily and accurately than ever before.

DESCRIPTION OF EMBODIMENTS

Figure 1:
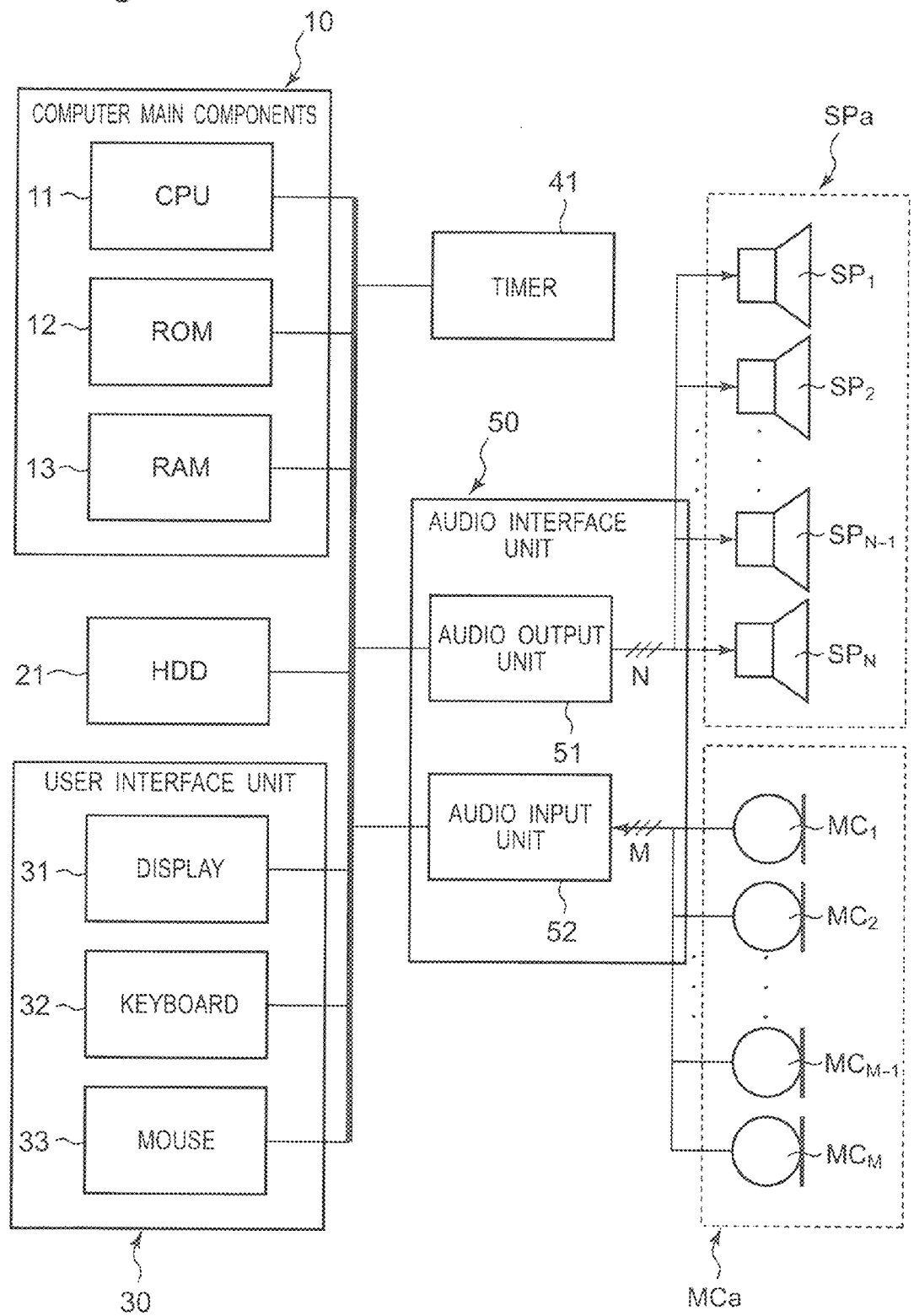
FIG. 1 is a block diagram of a hardware configuration of an object position estimating apparatus according to a first embodiment.

Embodiments according to the present invention are described below with reference to the accompanying drawings.

1. Outline

The embodiment of the present invention is an object position estimating apparatus which estimates positions of M objects in real space (where the M is an integer greater than or equal to 2). It is one of the features of the object position estimating apparatus that the apparatus includes:

a characteristic vector generating unit which generates, for each of the M objects, a characteristic vector, the characteristic vector including as its components measurements of the object measured on N scales, each of the N scales measuring closeness to each of N reference points in the real space (where the N is an integer greater than or equal to 3);

a dissimilarity matrix deriving unit which calculates a norm between the characteristic vectors of two objects for every pair from among the M objects and derives a dissimilarity matrix with M rows and M columns, the dissimilarity matrix including as its elements the calculated norms; and an estimation unit which estimates the positions of the M objects in the real space on the basis of the dissimilarity matrix and outputs an estimation result.

In this context, the M objects may be M microphones, for example. (The M may be an integer greater than or equal to 2 as mentioned above.)

In such a case, N loudspeakers are arranged in space for estimating the positions of the M microphones. (The N may be an integer greater than or equal to 3 as mentioned above.) The positions at which the N loudspeakers are disposed correspond to the above mentioned reference points, respectively.

The object position estimating apparatus causes the loudspeaker to emit a predetermined acoustic wave (by outputting a time stretched pulse signal (TSP signal) to the loudspeakers for measuring an impulse response of a microphone, for example), and determines the times (acoustic wave arrival time) at which the acoustic wave having been emitted from the loudspeaker firstly arrives at each of the microphones. For example, the apparatus specifies the time at which a waveform corresponding to the acoustic wave (an impulse response waveform, for example) firstly appears in an output from the microphone. In this case, the N scales which measure closeness to each of the N reference points are the time coordinate axes each used in the determination of the acoustic wave arrival time from each of the loudspeakers, and the measurements of the object are the acoustic wave arrival time at each of the microphones.

Then, based on the acoustic wave arrival time specified, the characteristic vector generating unit generates, for each microphone (object), a vector of N dimensions (a characteristic vector) which includes, as its components, the time when acoustic waves from N reference points have arrived. The characteristic vector generating unit generates the characteristic vector of N dimension, in which the N is same as the number of reference points, while considering the times when the acoustic waves emitted from reference points have reached the microphone as the measurements on the scales (the time axis as mentioned above) which measure the closeness to the reference points from the microphone in the real space. In short, the characteristic vector is a vectorial representation of characteristics of the microphone's position in the real space, in which the characteristics are represented with the measurements (acoustic wave arrival time) on N scales (time axes) that measure closeness to N reference points (loudspeakers) from the microphone in the real space.

Alternatively, the object position estimating apparatus may collect ambient sounds, in which a human voice is involved, using M microphones and calculate amplitude-frequency characteristics of an output signal from each of the microphones to generate the characteristic vector. In the approach just mentioned above, there is no need to cause the loudspeakers, which are disposed at N reference points as mentioned, to emit the predetermined acoustic waves. In the amplitude-frequency characteristics of the ambient sounds that involve a human voice, formants of the human voice appear therein. The formants are superposed on the components of ubiquitous noise from the recording environment (such as reverberant sound in a room, hustle and bustle sounds in outdoors, etc.). As the microphone position recedes from the speaker, the shape of the formant in the amplitude-frequency characteristics deviates from its original shape due to the increase of the effects from the noise. Accordingly, it is possible to determine the relative closeness between the speaker and each of the plural microphones by comparing the shapes of the amplitude-frequency characteristics of output signals from the microphones. For example, a value of integral of a difference between amplitude-frequency characteristics of output signals from two microphones along the frequency axis may be used as the difference between the measurements for the two microphones on the scale that defines closeness to the speaker (the dissimilarity with respect to the speaker). Because, even if the positions of the two microphones differ from each other, amplitude components originated from the noise appearing in the amplitude-frequency characteristics of output signals have little difference from each other. Accordingly, the amplitude components originated from noise can be cancelled out by taking the difference between the amplitude-frequency characteristics. Consequently, the difference between the amplitude-frequency characteristics involves information about the difference in closeness to the speaker. It is to be understood that the object position estimating apparatus is also capable of determining the measurement for each microphone on the scale defining closeness to the speaker (components regarding the speaker of the characteristic vector) based on the thus obtained difference of the amplitude-frequency characteristics for any two microphones.

On the other hand, it is known that an amplitude of a formant appearing in the amplitude-frequency characteristics decreases about 6 decibels if a distance between a speaker and a microphone increases twice, for example. Based on this relationship, the characteristic vector generating unit of the object position estimating apparatus may determine the components of the characteristic vector by identifying formant components of a speaker from an amplitude-frequency characteristic of an output signal of each microphone and deriving the measurement for each microphone representing closeness to the speaker position (corresponding to a reference point) with the use of the magnitude of the amplitude of the identified formant as the measurement. As mentioned above, three or more reference points are required. Accordingly, the object position estimating apparatus collects voices produced by a speaker(s) at N different points (N is greater than or equal to three) by means of the M microphones and generates the characteristic vector of N dimensions.

Then, the dissimilarity matrix deriving unit calculates a norm between the characteristic vectors for every pair from the M microphones and derives a matrix with M rows and M columns (a dissimilarity matrix) which includes the calculated norms as its elements.

Next and finally, the estimation unit estimates the positions of the M microphones in the real space based on the dissimilarity matrix and outputs an estimation result. The estimation unit applies the MultiDimensional Scaling method (MDS) to the dissimilarity matrix to obtain a configuration of M microphones, and estimates and outputs the positions of the M microphones in the real space from the obtained configuration.

Alternatively, the estimation unit of the object position estimating apparatus may numerically obtain an approximate solution of the configuration using full-search or local-search technique, and may estimate and output the positions of M microphones in the real space from the obtained configuration approximate solution. In this case, the estimation unit derives, for each of approximate solution candidates of the M microphones configuration, a distance matrix, each of whose elements is a distance between microphones. The estimation unit compares the derived distance matrix with the dissimilarity matrix to evaluate a suitability of the approximate solution candidate and determines the approximate solution candidate that shows the highest suitability among the evaluated approximate solution candidates as the approximate solution of the configuration.

In the M objects position estimation by the object position estimating apparatus according to the embodiment of the present invention, the positions of the above mentioned N reference points may be N arbitrary points, and information about the positions of the reference points in the real space (coordinate values of the reference points in the real space, for example) is not necessary. Accordingly, the object position estimating apparatus is capable of estimating positions of M objects without measuring a distance between a pair of position estimation target objects. For this, it is possible to estimate the positions of M objects in a very simple way. In addition, in the object position estimation according to the present invention, the characteristics of the object's position in the real space is firstly specified as a vector of N dimensions (the characteristic vector), which is identical to the number of reference points N (the number of loudspeakers, for example), and then, the dissimilarity with respect to the positions in the real space of the objects is derived from the thus generated N dimensional characteristic vector. For this, in the object position estimation according to the embodiment of the present invention, accuracy of the position estimation for M objects is improved as the number of the reference points (N) increases.

It is to be noted that the object position estimating apparatus according to the embodiment of the present invention requires loudspeakers to emit predetermined acoustic waves at the positions corresponding to the N reference points in order to generate the characteristic vectors for M microphones corresponding to the M position estimation target objects but this does not mean N loudspeaker units should necessarily be prepared. In the object position estimating apparatus according to the embodiment of the present invention, loudspeaker units less than N (one loudspeaker unit, for example) may be used to emit the predetermined acoustic waves at N positions.

Instead of the microphones, the M objects may be M loudspeakers (M may be an integer greater than or equal to 2 as mentioned above). In this case, N microphones are disposed and the characteristic vectors are generated while considering the positions where the respective microphones are disposed as the above mentioned reference points. Then the dissimilarity matrix for the M loudspeakers is derived from the M characteristic vectors and positions of the loudspeakers in the real space can be estimated from the dissimilarity matrix.

A person skilled in the art will comprehend the details of the method for estimating positions of M objects in the real space (where the M is an integer greater than or equal to 2) in the object position estimating apparatus which estimates the positions of objects in the real space from the descriptions about the object position estimating apparatus according to the embodiment of the present invention.

In addition, the person skilled in the art will comprehend the configuration of a computer program for causing a computer to operate as the object position estimating apparatus which estimates positions of M objects in the real space (where the M is an integer greater than or equal to 2) from the descriptions below.

2. First Embodiment 2-1. Configuration

FIG. 1 is a block diagram showing a configuration of an object position estimating apparatus according to the first embodiment. The object position estimating apparatus includes: a central processing unit (CPU) 11 which executes a program and performs a predetermined data processing; a read only memory (ROM) 12 which stores the program; a random access memory (RAM) 13 which stores a variety of data; a hard disk drive (HDD) 21 which functions as an auxiliary storage device; a display 31 which operates as an output device; a keyboard 32 and a mouse 33 which operate as input devices; a timer 41 which measures time; and an audio interface unit 50 which includes an audio output unit 51 and audio input unit 52 and operates as an input/output interface from/to external audio devices (loudspeakers and microphones). The audio interface unit 50 is connected to a speaker array SPa including N external loudspeakers ($SP_1$, $SP_2$, ..., $SP_N$) and a microphone array MCa including M external microphones ($MC_1$, $MC_2$, ..., $MC_N$).

The CPU 11, ROM 12, and RAM 13 constitute computer main components 10.

The display 31, keyboard 32, and mouse 33 constitute a user interface unit 30. Also, the user interface unit 30 may be composed of a display panel with a touch panel function or the like.

Figure 2:
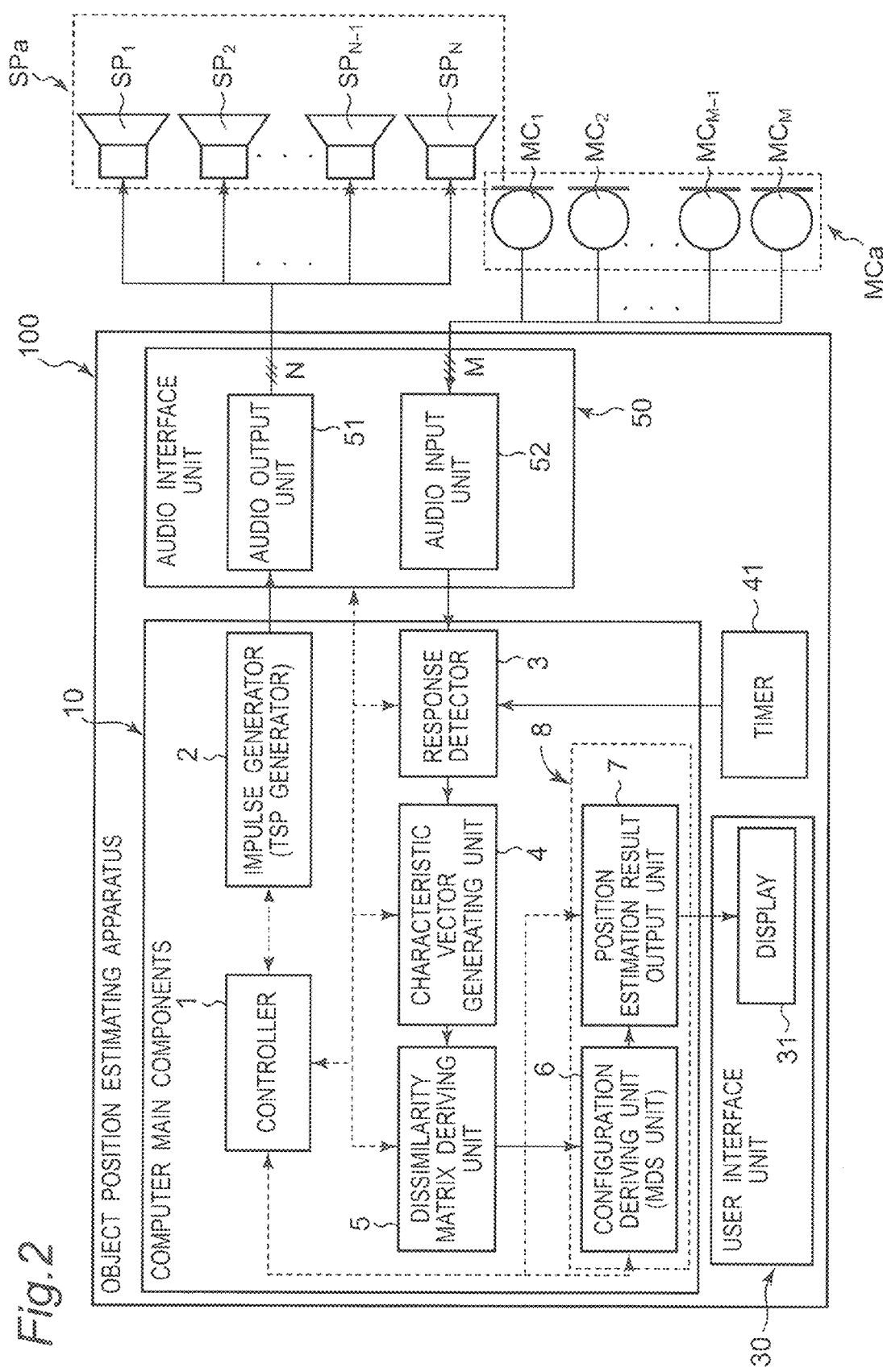
FIG. 2 is a diagram of a configuration of the object position estimating apparatus according to the first embodiment.

FIG. 2 is a block diagram explicitly illustrating functional blocks realized by the computer main components of the object position estimating apparatus 100 according to the first embodiment. The CPU 11 of the computer main components 10 reads out and executes an object position estimation program stored in the ROM 12 so that the CPU 11 can operate as a controller 1, an impulse generator (a TSP generator) 2, a response detector 3, a characteristic vector generating unit 4, a dissimilarity matrix deriving unit 5, a configuration deriving unit (MDS unit) 6, and a position estimation result output unit 7. The configuration deriving unit (MDS unit) 6 and the position estimation result output unit 7 constitute an estimation unit 8.

It is to be noted that the object position estimation program does not necessarily have to be stored in the ROM 12. The object position estimation program may be stored in the HDD 21 (FIG. 1). Even in such an environment, the CPU 11 can appropriately read out and execute the program. Further, the object position estimation program may be properly downloaded from an external storage device (not shown) via a network (not shown) and executed by the CPU 11. Furthermore, the object position estimation program may be stored in a portable storage device such as a flexible disk, an optical disc, a flash memory or the like (not shown). In such a case, the program that has been stored in the portable storage device may be read out therefrom and executed by the CPU 11. Alternatively, the program may be installed in the HDD 21 or the like once prior to the execution.

The controller 1 is realized when the CPU 11 executes the object position estimation program. The controller 1 monitors progress on the operations for the object position estimation and controls the entire apparatus 100.

The impulse generator (TSP generator) 2 is realized when the CPU 11 executes the object position estimation program. The impulse generator (TSP generator) 2 generates a signal for causing a loudspeaker to emit a predetermined acoustic wave and outputs the signal selectively to one or more loudspeakers of the speaker array SPa connected with the audio output unit 51. The signal is, for example, a signal that has a pulse shape waveform (a time stretched pulse waveform (TSP waveform)) (TSP signal).

The response detector 3 is realized when the CPU 11 executes the object position estimation program. From each of M inputs from the M microphones of the microphone array MCa connected to the audio input unit 52, the response detector 3 detects a response waveform to the above mentioned predetermined acoustic wave (an acoustic TSP wave emitted from a loudspeaker in response to the TSP signal, for example) (detects an impulse response waveform to the acoustic TSP wave), and specifies the times (acoustic wave arrival time) when the response waveforms were detected at respective M microphones by referring to the timer 41.

The characteristic vector generating unit 4 is realized when the CPU 11 executes the object position estimation program. The characteristic vector generating unit 4 inputs the acoustic wave arrival time specified by the response detector 3 and generates an N dimensional characteristic vector for each of the M microphones (objects).

The dissimilarity matrix deriving unit 5 is realized when the CPU 11 executes the object position estimation program. The dissimilarity matrix deriving unit 5 calculates a norm between characteristic vectors of two objects (microphones) for every pair of the M microphones. Then, the dissimilarity matrix deriving unit 5 derives a dissimilarity matrix with M rows and M columns that includes the calculated norms as its elements.

The configuration deriving unit (MDS unit) 6 is realized when the CPU 11 executes the object position estimation program. The configuration deriving unit (MDS unit) 6 derives a configuration of the M microphones in the real space on the basis of the dissimilarity matrix. For example, the configuration deriving unit (MDS unit) 6 applies the Multi-Dimensional Scaling (MDS) method to the dissimilarity matrix to derive the M microphones configuration.

The position estimation result output unit 7 is realized when the CPU 11 executes the object position estimation program. The position estimation result output unit 7 performs linear transform operations such as enlarging scaling, reducing scaling, rotating or the like onto the configuration derived by the configuration deriving unit 6 to estimate positions of the M microphones in the real space and outputs the result as a position estimation result. The configuration deriving unit (MDS unit) 6 and the position estimation result output unit 7 constitute the estimation unit 8 of the object position estimating apparatus according to the present embodiment.

It is to be noted that at least one of the controller 1, the impulse generator (TSP generator) 2, the response detector 3, the characteristic vector generating unit 4, the dissimilarity matrix deriving unit 5, the configuration deriving unit (MDS unit) 6, and the position estimation result output unit 7 may be implemented with a dedicated hardware circuitry.

2-2. Operations in Microphone Position Estimation

Below, with reference to FIGS. 3, 4, and 5, microphone position estimation performed by the object position estimating apparatus according to the present embodiment is described.

Figure 3:
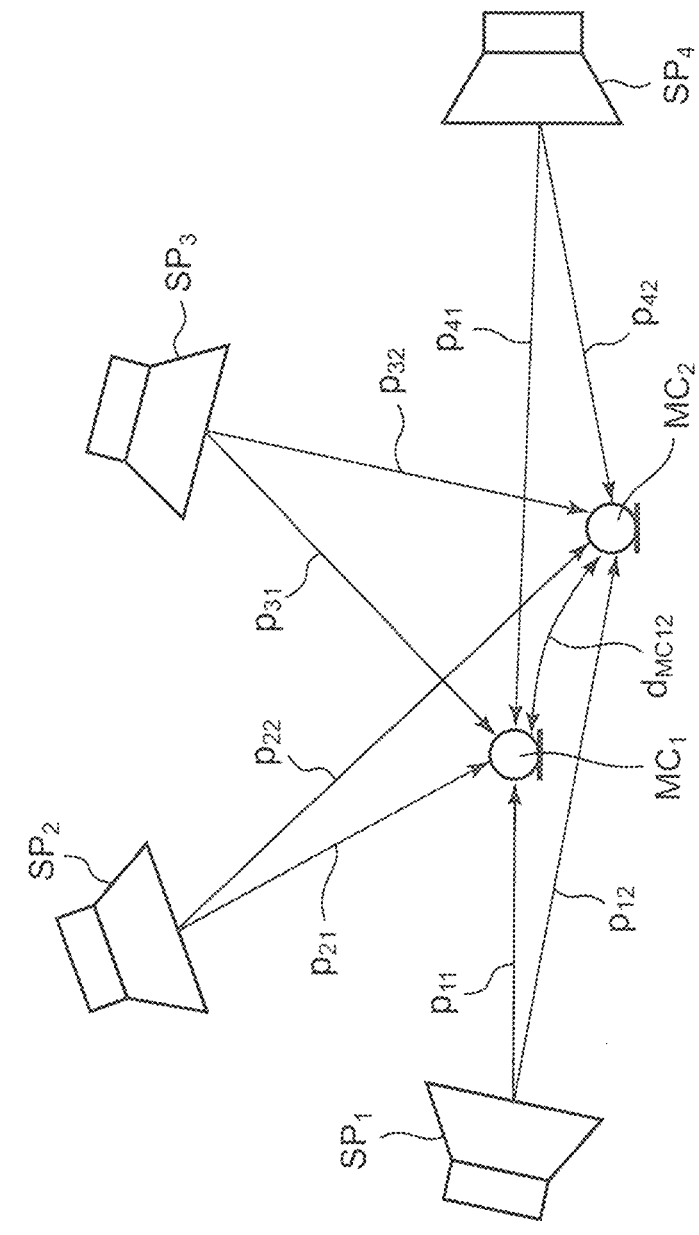
FIG. 3 is a schematic diagram illustrating a relationship among quantities used for microphone position estimation.

FIG. 3 is a schematic diagram illustrating relationships among M microphones as target objects of the position estimation, N loudspeakers disposed at positions corresponding to the reference points, and various quantities. For simplicity, only two microphones ($MC_1$ and $MC_2$) and four loudspeakers ($SP_1$, $SP_2$, $SP_3$, and $SP_4$) are depicted therein. $P_{ij}$ here denotes time (acoustic wave arrival time) when an acoustic wave (TSP wave) emitted from the i-th loudspeaker $SP_i$ reaches the j-th microphone ($MC_j$). $D_{MC12}$ denotes a norm between an N dimensional characteristic vector $p_{MC1}$ of the first microphone $MC_1$, which includes N acoustic wave arrival times $p_{i1}$ (i: 1 to N) of the first microphone $MC_1$ as its components, and an N dimensional characteristic vector $p_{MC2}$ of the second microphone $MC_2$, which includes N acoustic wave arrival times $p_{i2}$ (i: 1 to N) of the second microphone $MC_2$ as its components. The norm here may be a Euclidian norm, for example.

Figure 4:
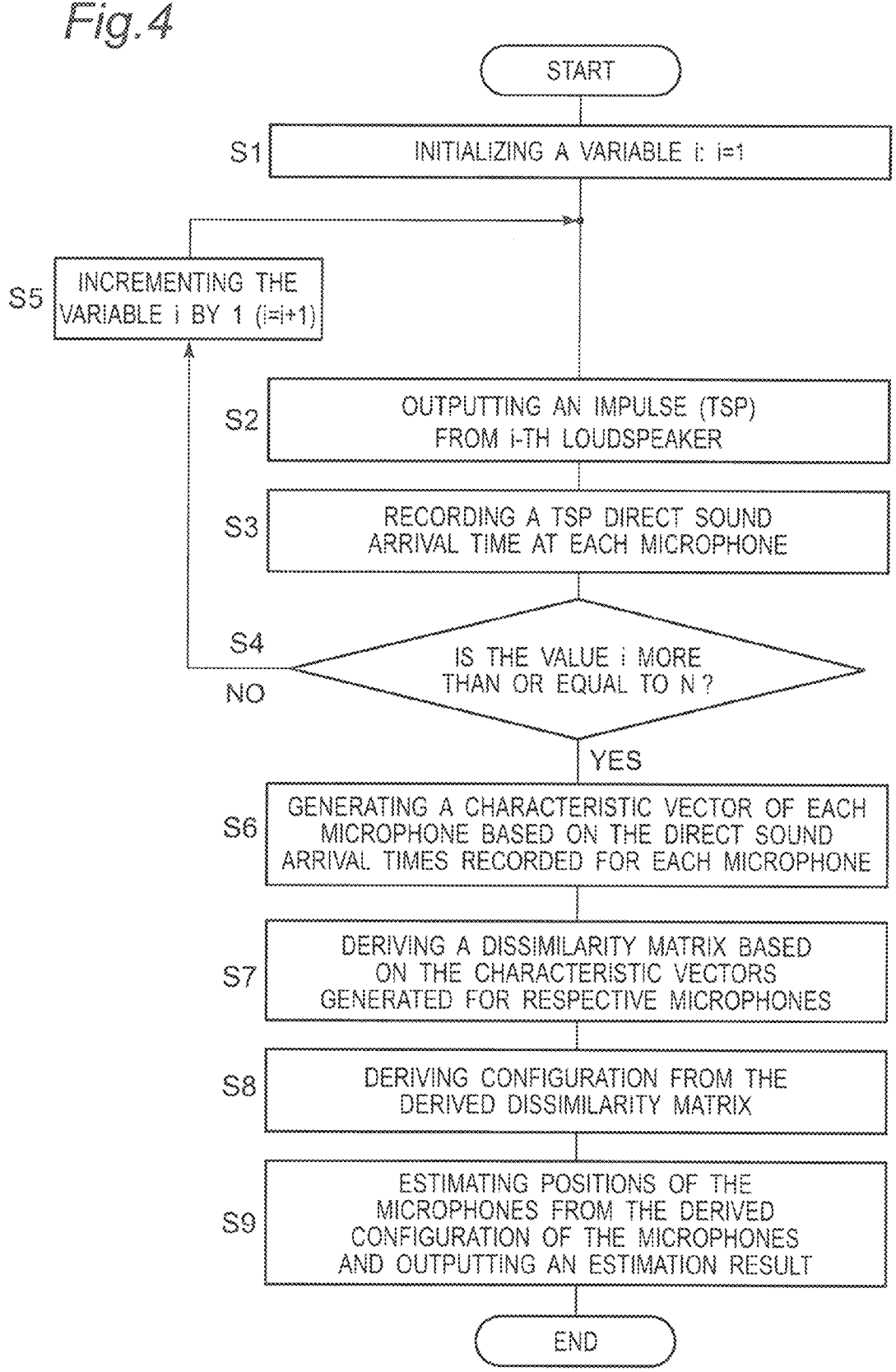
FIG. 4 is a flow chart of process performed by the object position estimating apparatus.

FIG. 4 is a flowchart of processes for the microphone position estimation performed by the object position estimating apparatus.

The controller 1 (CPU 11) of the object position estimating apparatus performs operations for initialization to set a variable i to 1 and store the variable i in the RAM 13 (S1).

Next, the impulse generator 2 (CPU 11) reads out a value of the variable i and a TSP waveform stored in the RAM 13 and outputs an acoustic wave signal including the TSP waveform to the connected i-th loudspeaker SPi, which is connected through the audio output unit 51. By this, the acoustic TSP wave is emitted from the i-th loudspeaker $SP_i$.

Figure 5:
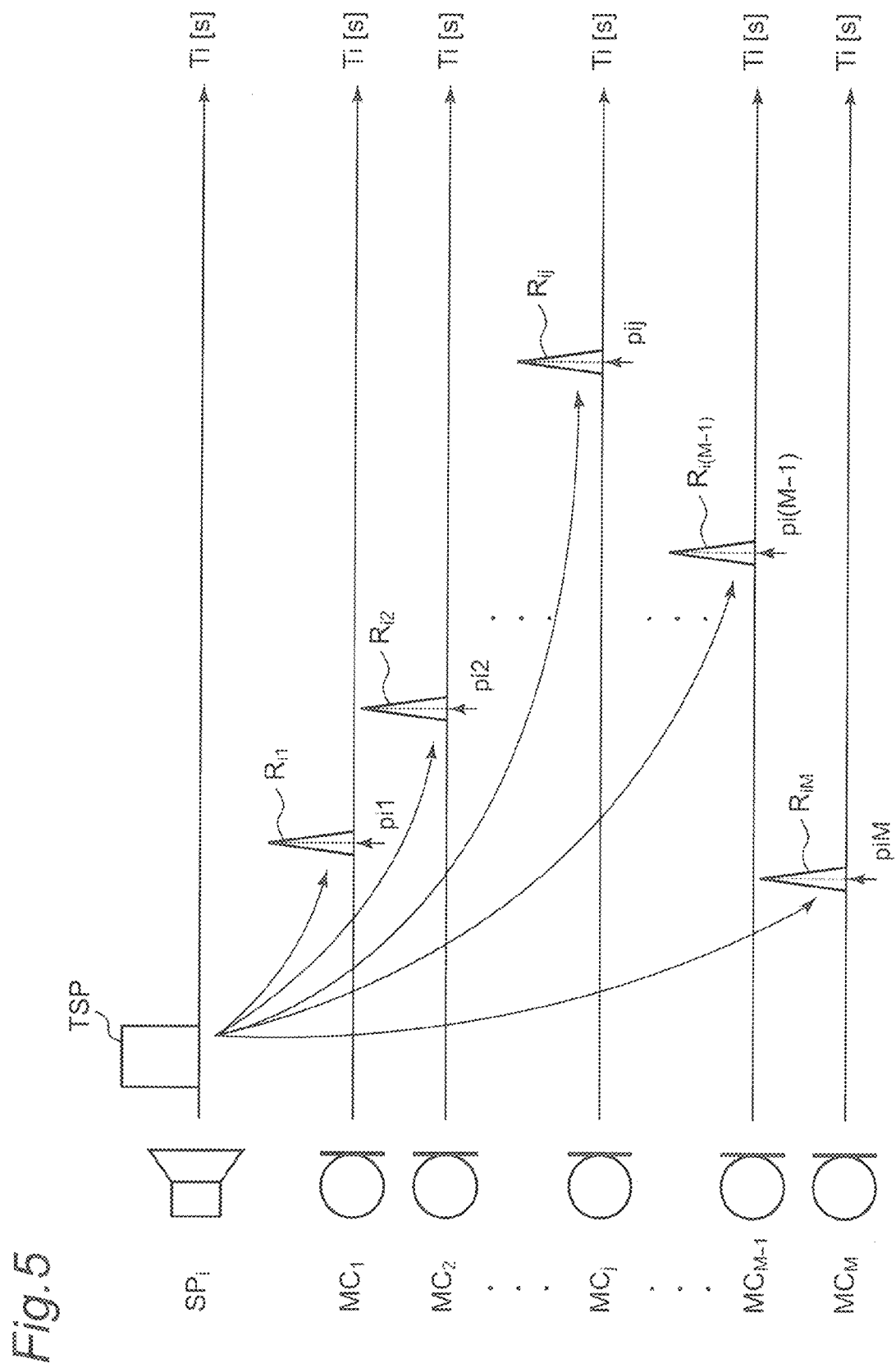
FIG. 5 is a diagram illustrating differences among times at which microphones pick up a time stretched pulse signal (TSP signal) emitted from an i-th loudspeaker.

FIG. 5 is a chart depicting a situation where the microphones ($MC_1$, $MC_2$, . . . , $MC_{M-1}$, $MC_M$) each collect the acoustic wave TSP emitted from the i-th loudspeaker $SP_i$. The time chart at the side of the i-th loudspeaker $SP_i$ indicates the acoustic TSP wave emitted from the i-th loudspeaker $SP_i$, and the time chart at the side of each of the microphones ($MC_1$, $MC_2$, . . . , $MC_j$, . . . , $MC_{M-1}$, $MC_M$) indicates a signal outputted from each microphone.

At Step S2 mentioned above, the i-th loudspeaker $SP_i$ emits a predetermined acoustic wave TSP into the air when the acoustic wave signal is inputted to the i-th loudspeaker $SP_i$. The acoustic wave propagates through the air at the speed of sound and recorded by each of the microphones ($MC_1$, $MC_2$, . . . , $MC_j$, . . . , $MC_{M-1}$, $MC_M$). For example, a response waveform $R_{i1}$ to the acoustic wave appears at around the time $p_{i1}$ on a time axis $T_i$ in the output from the 1st microphone $MC_j$. Also in the output from the j-th microphone $MC_j$, a response waveform $R_{ij}$ to the acoustic wave appears at around the time $p_{ij}$. Output from each of the microphones ($MC_1$, $MC_2$, . . . , $MC_j$, . . . , $MC_{M-1}$, $MC_M$) is stored in the RAM 13.

Referring to FIG. 4 again, the response detector 3 (CPU 11) receives the output from each of the microphones ($MC_1$, $MC_2, \ldots, MC_j, \ldots, MC_{M-1}, MC_M$) via the audio input unit 52, or reads out the output from the RAM 13 otherwise, and specifies the time when a peak of a response waveform in each of the outputs appears as acoustic wave arrival time $p_{ij}$ on the time axis $T_i$ for the microphone $MC_j$ (j: 1 to M) (S3). Other property of the response waveform (such as rising timing, timing at which the response surpasses a predetermined sound pressure, or the like) may as well be used as the basis for specifying the acoustic wave arrival time. The specified acoustic wave arrival time is stored in the RAM 13.

Next, the controller 1 (CPU 11) checks whether the value of the variable i is greater than or equal to N or not. If the value i is less than N, the process returns back to step S2 through step S5. On the other hand, if the value i is greater than or equal to N, the process proceeds to step S6.

In step S5, the value i is incremented by one (i→i+1), and the new value of the variable i is stored in the RAM 13. Accordingly, in the next step S2, an acoustic TSP wave is emitted from the loudspeaker $SP_{(i+1)}$, which is the loudspeaker numbered next to the loudspeaker that has emitted the acoustic wave in the previous step S2, and each of the microphones ($MC_1, MC_2, \ldots, MC_j, \ldots, MC_{M-1}, MC_M$) collects and outputs it as a response waveform. Next, in step S3, the response detector 3 specifies an acoustic wave arrival time $p_{i+1,j}$ with the use of a time axis $T_{i+1}$, at which the acoustic TSP wave emitted from the loudspeaker reaches each of the microphones $MC_j$ (j: 1 to M). In this context, the time axis $T_i$, which is used as a scale for specifying the arrival time of the acoustic wave from the i-th loudspeaker $SP_i$, and the time axis $T_{i+1}$, which is used as a scale for specifying the arrival time of the acoustic wave from the (i+1)-th loudspeaker $SP_{i+1}$ may be identical or different from each other.

In this way, the object position estimating apparatus specifies the time $p_{ij}$ (i: 1 to N, j: 1 to M) on an arbitrary time axis, at which an acoustic wave emitted from each of the loudspeakers ($SP_1, SP_2, \ldots, SP_{N-1}, SP_N$) arrives at each of the microphones ($MC_1, MC_2, \ldots, MC_j, \ldots, MC_{M-1}, MC_M$), by repeating the processes from step S2 to step S5 N times. It is to be noted that the response detector 3 only has to specify the time when an acoustic wave reaches each of the microphones ($MC_1, MC_2, \ldots, MC_j, \ldots, MC_{M-1}, MC_M$) on an arbitrary time axis and it is not necessary to determine an actual time interval taken to arrive at each of the microphones ($MC_1, MC_2, \ldots, MC_j, \ldots MC_{M-1}, MC_M$) from each of the loudspeakers ($SP_1, SP_2, \ldots, SP_{N-1} SP_N$). Accordingly, the object position estimating apparatus does not have to specify the time when each of the loudspeakers ($SP_1, SP_2, \ldots SP_{N-1}, SP_N$) emits the acoustic wave. Therefore, in the object position estimating apparatus, errors that might have been caused in specifying the time when the acoustic wave is emitted from each of the loudspeakers ($SP_1, SP_2, \ldots, SP_{N-1} SP_N$) are never introduced into the object position estimation result.

Next, the characteristic vector generating unit 4 (CPU 11) receives the acoustic wave arrival time ($p_{ij}$ (i: 1 to N, j: 1 to M)) and generates N dimensional characteristic vectors $p_{MCj}$ for M microphones $MC_j$ respectively (S6). The generated characteristic vectors $p_{MCj}$ are stored in the RAM 13.

The N dimensional characteristic vector $p_{MC1}$ represents characteristics of the position in the real space of the j-th microphone with N dimensional scales, each of which measures closeness to one of the N loudspeakers $SP_i$ (i: 1 to N). Specifically, the characteristic vector $p_{MCj}$ is represented as follows:

[Math. 1]

$$p_{MCj} = \begin{bmatrix} \text{measurement of } j\text{-}th \text{ microphone on a scale} \\ \text{measuring closeness to } 1st \text{ loudspeaker} \\ \text{measurement of } j\text{-}th \text{ microphone on a scale} \\ \text{measureing closeness to } 2nd \text{ loudspeaker} \\ \vdots \\ \text{measurement of } j\text{-}th \text{ microphone on a scale} \\ \text{measuring closeness to } j\text{-}th \text{ loudspeaker} \\ \vdots \\ \text{measurement of } j\text{-}th \text{ microphone on a scale} \\ \text{measuring closeness to } (N\text{-}1)\text{-}th \text{ loudspeaker} \\ \text{measurement of } j\text{-}th \text{ microphone on a scale} \\ \text{measuring closeness to } N\text{-}th \text{ loudspeaker} \end{bmatrix} = \begin{bmatrix} p_{1,j} \\ p_{2,j} \\ \vdots \\ p_{i,j} \\ \vdots \\ p_{N-1,j} \\ p_{N,j} \end{bmatrix}. \quad (1)$$

In short, the scale measuring closeness to i-th loudspeaker $SP_i$ (i: 1 to N) is a time axis $T_i$ (FIG. 5) which is used by the response detector 3 for specifying the time when an acoustic wave arrived at the microphones $MC_j$ (j: 1 to M) from the i-th loudspeaker $SP_i$, and the measurement of j-th microphone $MC_j$ on each of the scales is the acoustic wave arrival time $p_{ij}$ on the time axis $T_i$ which is used by the response detector 3 for specifying the acoustic wave arrival time (FIG. 5).

The N scales used for constructing the N dimensional characteristic vector may not be time axes. The scales may be distances in the real space, for example. Also, the scales may be peak levels of response waveforms detected by the microphones, for example. Also, the scales may be quantities representing properties of shapes of response waveforms detected by the microphones, for example. Also, the scales may be quantities representing properties of indirect sounds (reverberant components) detected by the microphones.

Next, the dissimilarity matrix deriving unit 5 (CPU 11) derives a dissimilarity matrix D based on the N dimensional characteristic vectors $p_{MCj}$ of the M microphones that have been generated by the characteristic vector generating unit 4 and stored in the RAM 13 (S7). The generated dissimilarity matrix D is stored in the RAM 13.

The dissimilarity matrix D is a matrix with M rows and M columns including as its elements a norm $d_{MCkl}$ between the characteristic vectors ($p_{MCk}$ and $p_{MCl}$) of every pair of the M microphones $MC_j$ (j: 1 to M) (microphones $MC_k$ and $MC_l$, for example), which are the position estimation target objects.

Namely, each of the elements $d_{MCkl}$ is expressed as:

[Math. 2]

$$d_{MCk,l} = \|p_{MCk} - p_{MCl}\| \quad (2)$$

Accordingly, the dissimilarity matrix

[Math. 3]

$$D = (d_{MCk,l}) \quad (3)$$

is a matrix representing a positional dissimilarity of M microphones in the real space, which is obtained through defining a positional dissimilarity of two microphones in the real space in accordance with the N dimensional characteristic vectors $P_{MCj}$ (j: 1 to M).

Next, the configuration deriving unit (MDS unit) 6 (CPU 11) applies the MDS to the dissimilarity matrix D to derive a configuration of the M microphones. The derived configuration is stored in the RAM 13.

The configuration deriving unit (MDS unit) 6 determines an M×M matrix $D^{(2)}$ including $d_{MCkl}^2$ as its elements,

[Math. 4]

$$D^{(2)} = (d_{MCk,l}^2) \quad (4)$$

Next, the configuration deriving unit (MDS unit) 6 uses the Kronecker delta $\delta_{kl}$,

[Math. 5]

$$h_{k,l}\delta_{kl} - 1/m \quad (5)$$

and a centralized M×M matrix H

[Math. 6]

$$H = \begin{pmatrix} 1-\frac{1}{m} & -\frac{1}{m} & \cdots & -\frac{1}{m} & -\frac{1}{m} \\ -\frac{1}{m} & 1-\frac{1}{m} & -\frac{1}{m} & \cdots & -\frac{1}{m} \\ \vdots & -\frac{1}{m} & \ddots & \vdots & \vdots \\ -\frac{1}{m} & \cdots & -\frac{1}{m} & 1-\frac{1}{m} & -\frac{1}{m} \\ -\frac{1}{m} & -\frac{1}{m} & \cdots & -\frac{1}{m} & 1-\frac{1}{m} \end{pmatrix} \quad (6)$$

including as its elements $h_{kl}$ to obtain an M×M matrix B expressed as:

[Math. 7]

$$B = -\tfrac{1}{2} H^t D^{(2)} H \quad (7)$$

Finally, the configuration deriving unit (MDS unit) 6 solves an eigenvalue problem with respect to B,

[Math. 8]

$$Bz_t = \lambda_t z_t (t=1,2,\ldots,M) \quad (8)$$

$$\lambda_1 \geq \lambda_2 \geq \lambda_3 \geq \ldots \geq \lambda_M \quad (9)$$

to derive the configuration of the M microphones with respect to an axis of r-th dimension.

[Math. 9]

$$x_r = \sqrt{\lambda_r} Z_r \quad (10)$$

Among them, the configuration of a vector $x_r$ (r: 1, 2, 3) with respect to the axes of r-th dimensions (r=1, 2, 3) are used to derive an M-rows and 3-columns configuration matrix X.

[Math. 10]

$$X = (x_1, x_2, x_3) \quad (11)$$
$$= \begin{pmatrix} x_{1,MC1} & x_{2,MC1} & x_{3,MC1} \\ \vdots & \vdots & \vdots \\ x_{1,MCj} & x_{2,MCj} & x_{3,MCj} \\ \vdots & \vdots & \vdots \\ x_{1,MCM} & x_{2,MCM} & x_{3,MCM} \end{pmatrix}$$

From above, a configuration in the real space (three-dimensional space) of the M microphones $MC_j$ (j: 1 to M) is obtained.

There may be a case in which the configuration matrix X derived by the configuration deriving unit (MDS unit) 6 represents actual M microphone positions that have undergone a linear transformation (enlarging, reducing, rotating, reversing (mirror-imaging) etc.). Then, the position estimation result output unit 7 reads out from the RAM 13 the configuration matrix X derived by the configuration deriving unit (MDS unit) 6 and performs an appropriate linear transformation to the configuration so that the actual M microphone positions are determined. The determined positions are stored in the RAM 13.

In a case where a variance of a coordinate of the M microphone positions in the real space is known, the position estimation result output unit 7 determines a variance of a coordinate of the configuration matrix X with respect to each coordinate of the configuration matrix X, and enlarges or reduces the values of the three coordinates of the configuration matrix such that any one variance of the three coordinates of the configuration matrix X may match the above mentioned known variance.

Alternatively, in a case where the most spread two microphone's distance in the M microphone positions in the real space is known with respect to a specific coordinate axis, for example, the position estimation result output unit 7 enlarges or reduces the values of the three coordinates of the configuration matrix such that the value of the specific coordinate of the most spread configuration between two microphones may match the above mentioned known distance.

In this way, the position estimation result output unit 7 may perform a linear transformation to the configuration matrix X based on the known information about the positions in the real space of the position estimation target objects (information about positions in the real space of three arbitrary objects among the M objects, for example,) to estimate and output the positions of the position estimation target objects. As a matter of course, there may be a case in which the configuration indicated by the configuration matrix X and its coordinates in the real space have a mirrored image relationship with each other. In such a case, the position estimation result output unit 7 may invert the positive and negative of a value of any one coordinate of the configuration matrix X so that the configuration of the configuration matrix X can match the coordinates in the real space.

2-3. Result of Microphone Position Estimation Experiment

Below, a result of a microphone position estimation experiment with the object position estimating apparatus according to the present embodiment will be described.

Figure 6:
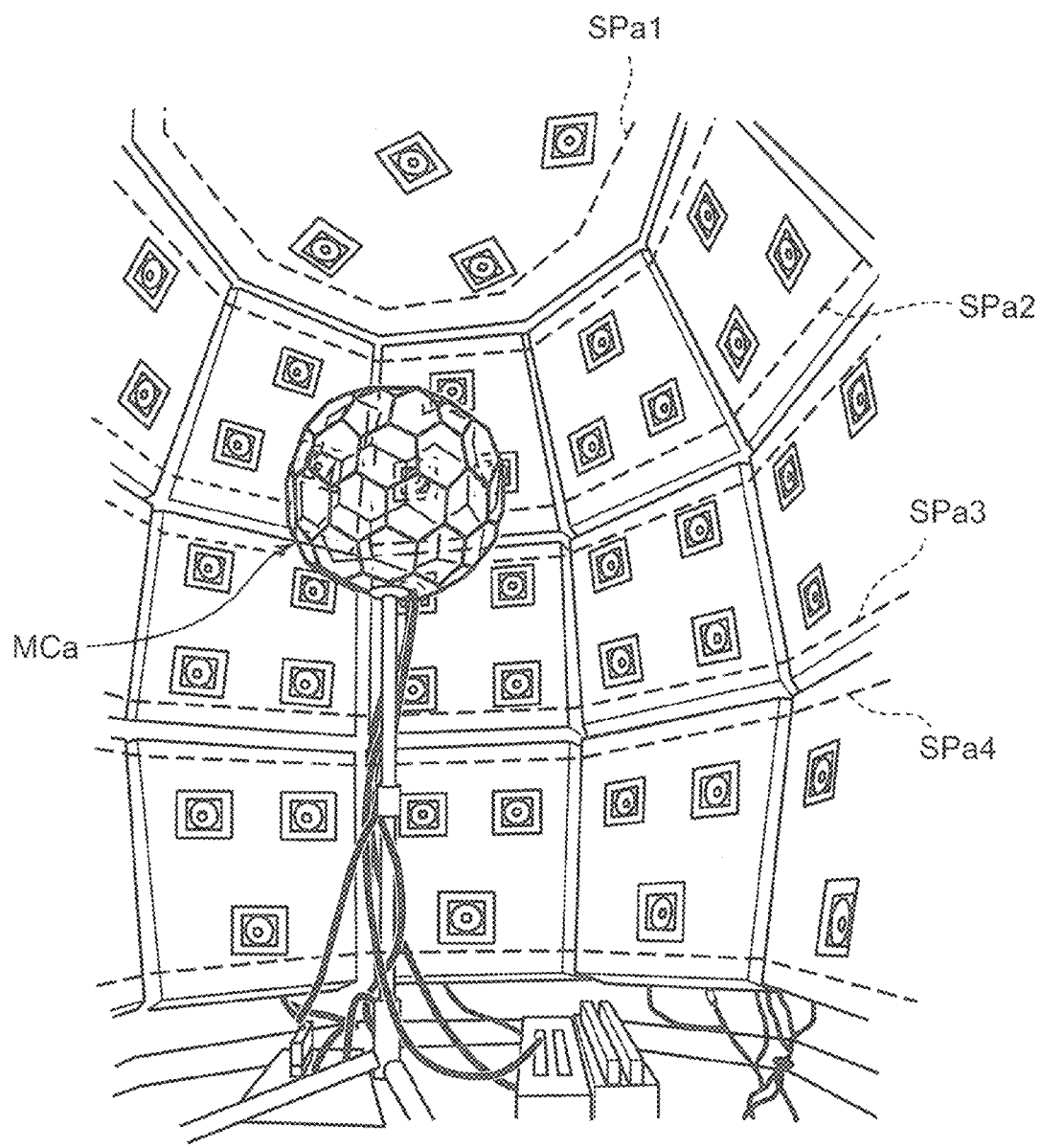
FIG. 6 is a diagram showing experimental environments of a microphone position estimation experiment and a loudspeaker position estimation experiment with the first embodiment.

As shown in FIG. 6, the present experimental test is conducted under the circumstance in which an 80-ch microphone array MCa is disposed in a sound field reproduction environment composed of a 96-ch speaker array (SPa1, SPa2, SPa3, SPa4). The microphone array MCa is made up of a C80 fullerene frame structure of about 46 cm diameter and non-directional microphones (DPA 4060-BM), every one of which is disposed at a node of the frame structure. The sound field reproduction environment of a 96-ch speaker system has loudspeakers each of which is built into a cuboid enclosure (Fostex FE103En). Among the loudspeakers, 90 of them are disposed at walls of a room having a 9-sided regular polygonal horizontal section, and 6 of them are disposed at the ceiling of the room.

Under such a circumstance, an experimental test of 80 microphones position estimation is conducted using the object position estimating apparatus according to the present embodiment. In the experimental test, the conditions for outputting and detecting an acoustic wave are set such that: a TSP length be 8192 [pnt]; a TSP response length be 32768 [pnt]; a sampling frequency be 48000 [Hz]; and a quantization bit rate be 16 [bit].

Figure 7A:
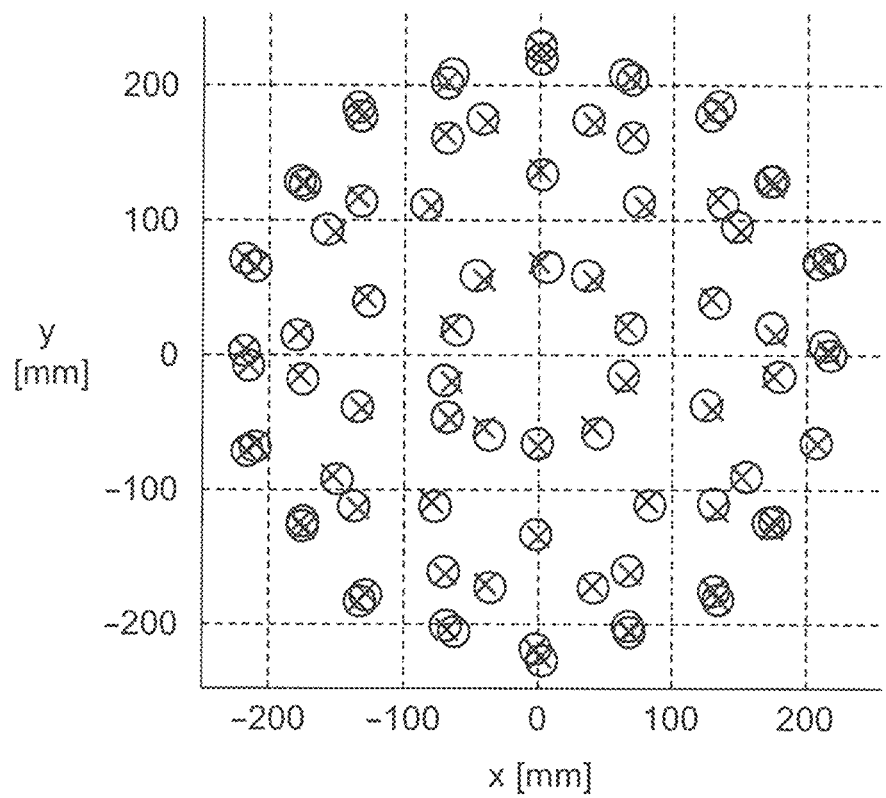
FIG. 7A is a diagram showing a result of the microphone position estimation with the first embodiment.
Figure 7B:
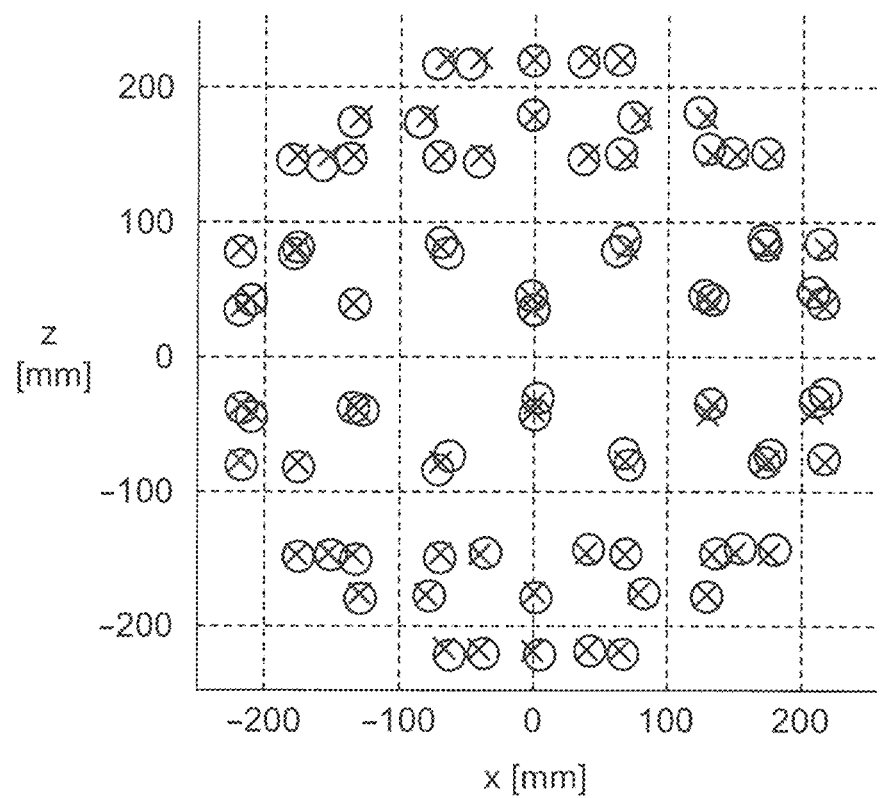
FIG. 7B is a diagram showing a result of the microphone position estimation with the first embodiment.
Figure 7C:
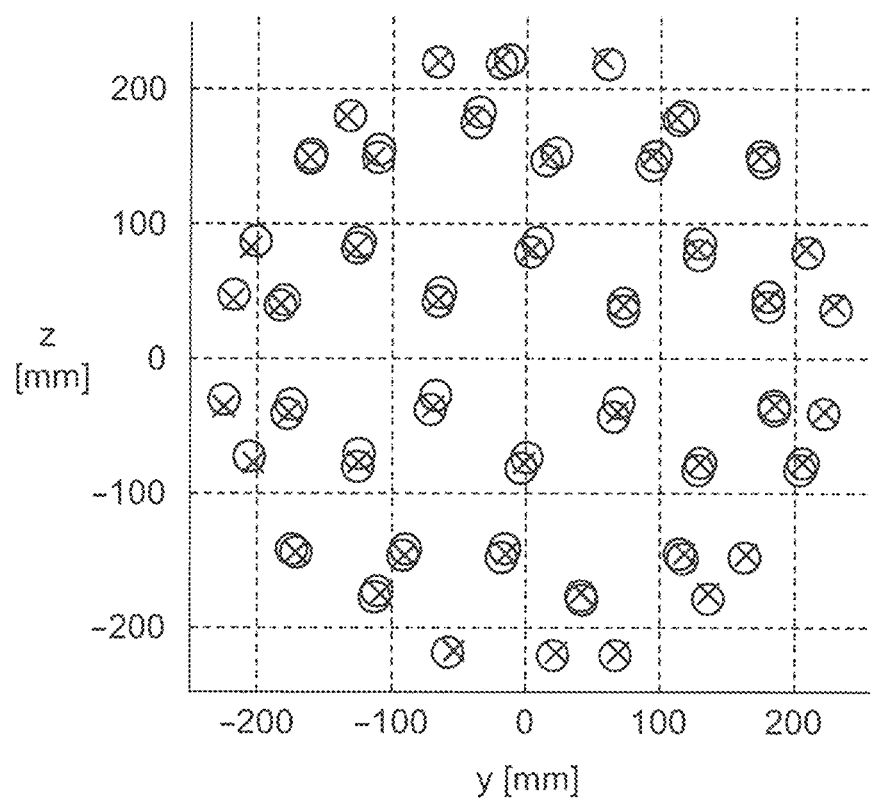
FIG. 7C is a diagram showing a result of the microphone position estimation with the first embodiment.

FIGS. 7A, 7B, and 7C show a result of the test. Those figures show the result viewed from straight above, straight in front, and laterally (from a direction rotated horizontally by 90 degrees from the front direction), respectively. In the figures, actual positions of the microphones are denoted by X and position estimation results are denoted by O.

In addition, gaps between the actual positions and the positions from the position estimation are obtained, and the average thereof is determined as an error estimation value [mm]. In this test, the error estimation value is 4.8746 [mm]. From this test result, it is found that the object position estimating apparatus according to the present embodiment is capable of outputting an estimation result with satisfactory accuracy for checking the arrangement of microphones and right or wrong of cable connections.

2-4. Relation Between Estimation Error and Number of Loudspeakers in the Microphone Position Estimation Below, relationship between the number of loudspeakers (the number of positions where acoustic waveforms (TSP waveforms) are emitted from) used in the method for object position estimation according to the present embodiment and the accuracy of the result of the object position estimation will be described.

Figure 8:
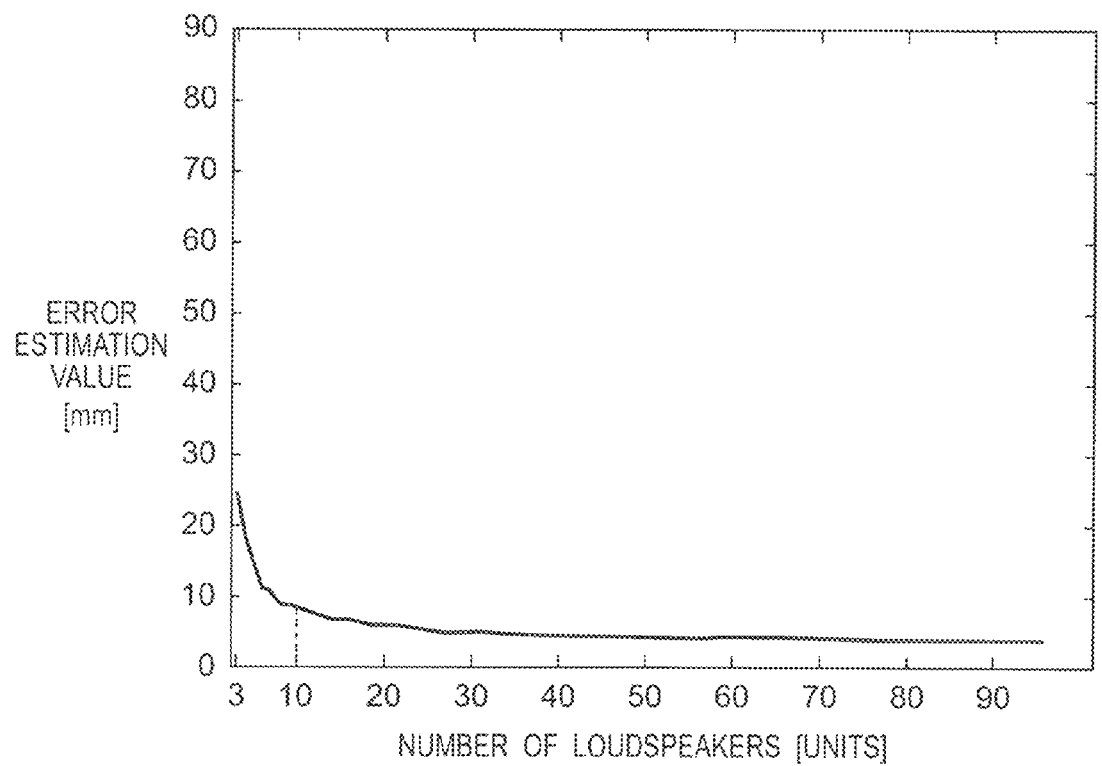
FIG. 8 is a diagram showing a relationship between accuracy of the estimation results and the number of loudspeakers used at the microphone position estimation with the first embodiment.

For investigating the relationship between the number of loudspeakers and the accuracy of the object position estimation, a number of experimental tests are conducted while the number of loudspeakers is varied. FIG. 8 is a graph in which the results are plotted with the horizontal axis as the number of loudspeakers and the vertical axis as the above mentioned error estimation values for estimation results. As can be seen from FIG. 8, in the present embodiment, the accuracy of the object position estimation is enhanced monotonically as the number of the loudspeakers (the number of the above mentioned reference points) increases. Especially, as the number of the loudspeakers is increased towards 10, the accuracy of the object position estimation is dramatically enhanced. From this, it can be found that the object position estimation result is obtained with good accuracy when approximately ten or more loudspeakers (above mentioned reference points) are used.

2-5. Operations in Loudspeaker Position Estimation

As already mentioned, the object position estimating apparatus is capable of estimating positions of M loudspeakers with the use of N microphones which are arranged at positions corresponding to the N reference points. Below, principles of the loudspeaker position estimation and results of experimental tests thereof will be described with reference to FIGS. 9, 10A, 10B, and 10C.

Figure 9:
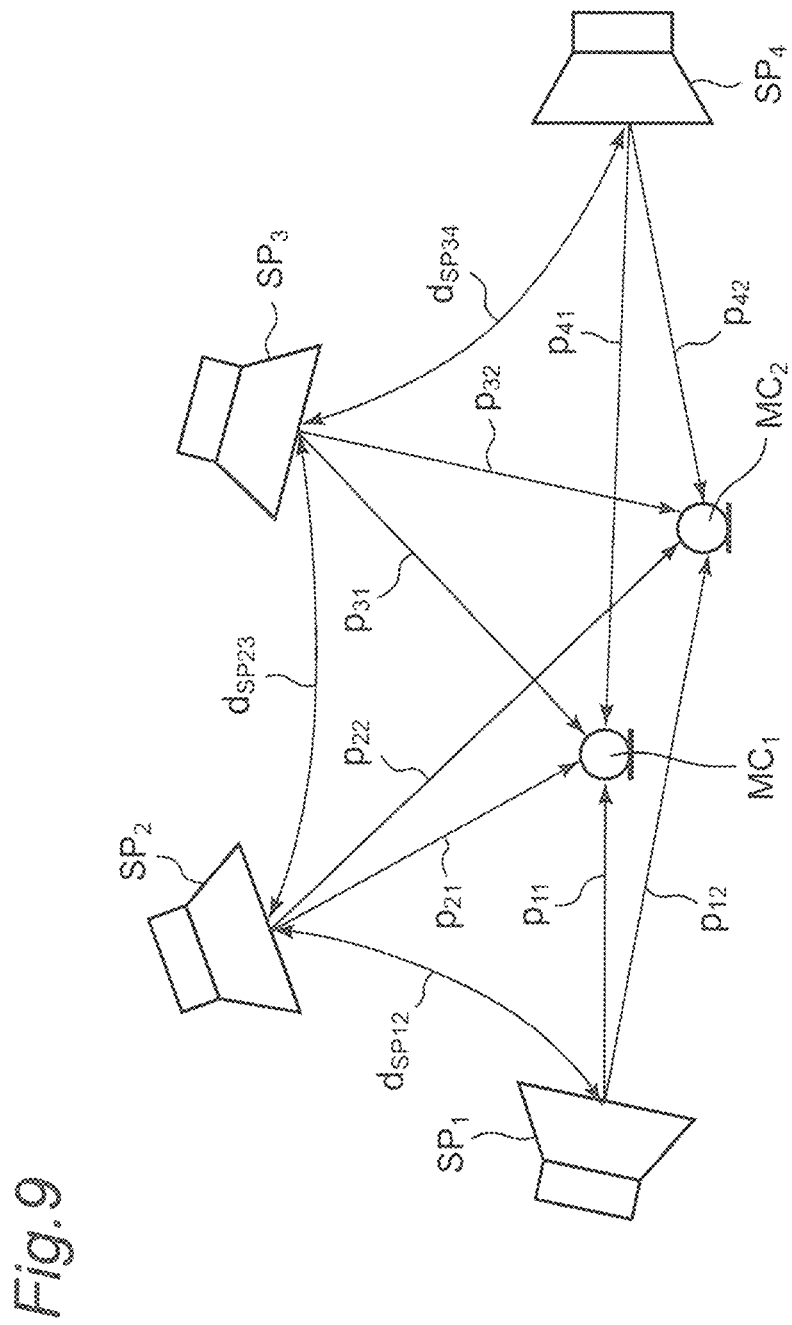
FIG. 9 is a schematic diagram illustrating a relationship among quantities used for loudspeaker position estimation.

FIG. 9 is a schematic diagram illustrating relationships among M loudspeakers as target objects of the position estimation, N microphones disposed at positions corresponding to the reference points, and various quantities. For simplicity, only two microphones ($MC_1$ and $MC_2$) and four loudspeakers ($SP_1$, $SP_2$, $SP_2$, and $SP_4$) are depicted therein. $P_{ij}$ here denotes time (acoustic wave arrival time) when an acoustic wave (TSP wave) emitted from the i-th loudspeaker $SP_i$ reaches the j-th microphone ($MC_j$). $d_{SP12}$ denotes a norm between an N dimensional characteristic vector $p_{SP1}$ of the first loudspeaker $SP_1$, which includes as its components N acoustic wave arrival time $p_{1j}$ (j: 1 to N) when the acoustic wave emitted from the first loudspeaker $SP_1$ arrives at the respective N microphones $MC_j$ (j: 1 to N), and an N dimensional characteristic vector $p_{SP2}$ of the second loudspeaker $SP_2$, which includes as its components N acoustic wave arrival time $p_{2j}$ (j: 1 to N) when the acoustic wave emitted from the second loudspeaker $SP_2$ arrives at the respective N microphones $MC_j$ (j: 1 to N). Similarly, $d_{SP23}$ and $d_{SP34}$ are a norm between the N dimensional characteristic vector $p_{SP2}$ of the second loudspeaker $SP_2$ and an N dimensional characteristic vector $p_{SP3}$ of a third loudspeaker $SP_3$ and a norm between the N dimensional characteristic vector $p_{SP3}$ of the third loudspeaker $SP_3$ and an N dimensional characteristic vector $p_{SP4}$ of a fourth loudspeaker $SP_4$, respectively.

In the loudspeaker position estimation, the characteristic vector generating unit 4 generates a characteristic vector $p_{SPi}$ (i: 1 to M) for each of the M loudspeakers $SP_i$ (i: 1 to M) corresponding to the M position estimation target objects while considering the positions where the microphones $MC_j$ (j: 1 to N) are disposed as the above mentioned reference points. And then, a dissimilarity matrix for M loudspeaker positions in the real space is derived from the M characteristic vectors, and the positions in the real space of the loudspeakers are estimated from the dissimilarity matrix.

In this case, the N dimensional characteristic vector $p_{SPi}$ represents characteristics of the position in the real space of the i-th loudspeaker with N dimensional scales, each of which measures closeness to one of the N microphones $MC_i$ (i: 1 to N). Specifically, the characteristic vector $p_{SPi}$ is represented as follows:

[Math. 11]

$$p_{SPi} = \begin{bmatrix} \text{measurement of } i\text{-}th \text{ loudspeaker on a scale} \\ \text{measuring closeness to } 1st \text{ microphone} \\ \text{measurement of } i\text{-}th \text{ loudspeaker on a scale} \\ \text{measureing closeness to } 2nd \text{ microphone} \\ \vdots \\ \text{measurement of } i\text{-}th \text{ loudspeaker on a scale} \\ \text{measuring closeness to } j\text{-}th \text{ microphone} \\ \vdots \\ \text{measurement of } i\text{-}th \text{ loudspeaker on a scale} \\ \text{measuring closeness to } (N\text{-}1)\text{-}th \text{ microphone} \\ \text{measurement of } i\text{-}th \text{ loudspeaker on a scale} \\ \text{measuring closeness to } N\text{-}th \text{ microphone} \end{bmatrix} \quad (1')$$

$$= \begin{bmatrix} p_{i,1} \\ p_{i,2} \\ \vdots \\ p_{i,j} \\ \vdots \\ p_{i,N-1} \\ p_{i,N} \end{bmatrix}.$$

Next, the dissimilarity matrix deriving unit 5 (CPU 11) calculates a norm between characteristic vectors of two loudspeakers for every pair of two objects among the M loudspeakers. Then, the dissimilarity matrix deriving unit 5 derives an M-rows and M-columns dissimilarity matrix including the calculated norms as its elements.

Specifically, the dissimilarity matrix deriving unit 5 (CPU 11) derives the dissimilarity matrix D based on the N dimensional characteristic vectors $p_{SPi}$.

Namely, each of the elements $d_{SPk,l}$ is expressed as:

[Math. 12]

$$d_{SPk,l} = \|p_{SPk} - p_{SPl}\| \quad (2')$$

Accordingly, the dissimilarity matrix

[Math. 13]

$$D = (d_{SPk,l}) \quad (3')$$

is a matrix representing a positional dissimilarity of M loudspeakers in the real space, which is obtained through defining a positional dissimilarity of two loudspeakers in the real space in accordance with the N dimensional characteristic vectors $P_{SPi}$ (i: 1 to M).

Next, the configuration deriving unit (MDS unit) 6 (CPU 11) applies the MDS to the dissimilarity matrix D to derive a configuration of the M loudspeakers.

Again, the position estimation result output unit performs an appropriate linear transformation to the configuration matrix X derived by the configuration deriving unit (MDS unit) 6 so that the actual M loudspeaker positions are determined.

2-6. Result of Loudspeaker Position Estimation Experiment

Below, a result of a loudspeaker position estimation experiment with the object position estimating apparatus according to the present embodiment will be described. The experimental circumstance is identical to that of the above mentioned microphone position estimation experiment, and the description thereof is omitted here.

Figure 10A:
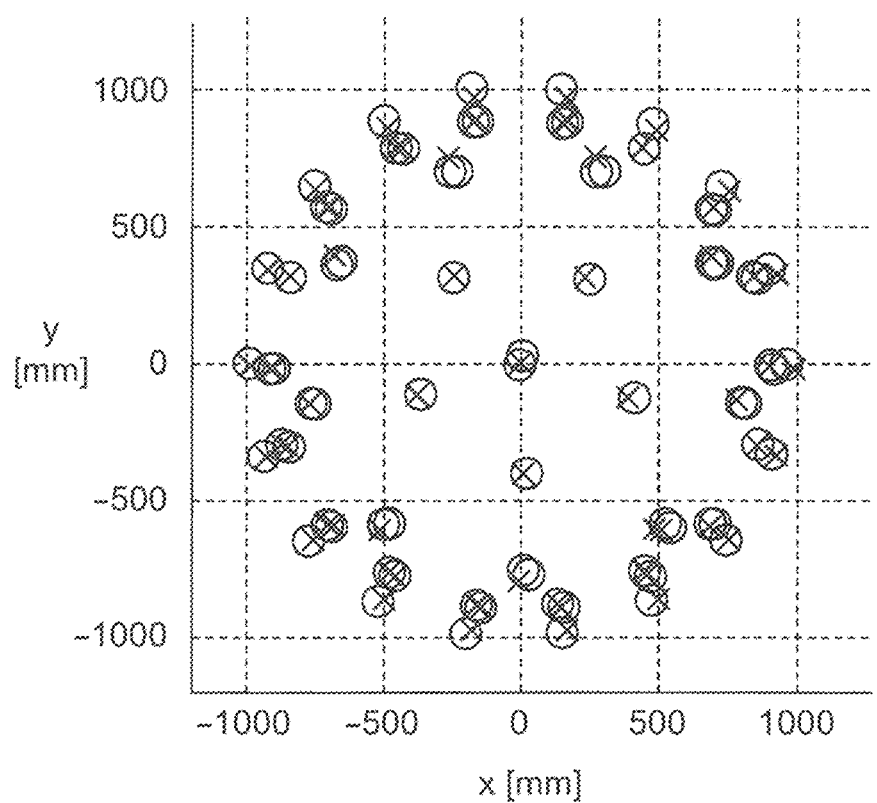
FIG. 10A is a diagram showing a result of the loudspeaker position estimation with the first embodiment.
Figure 10B:
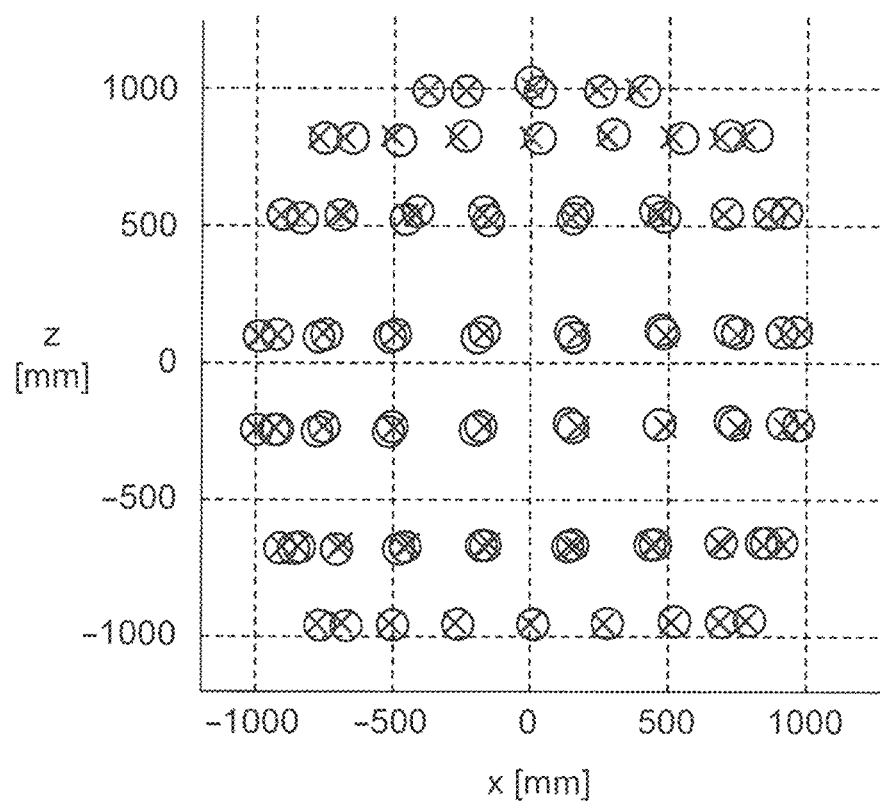
FIG. 10B is a diagram showing a result of the loudspeaker position estimation with the first embodiment.
Figure 10C:
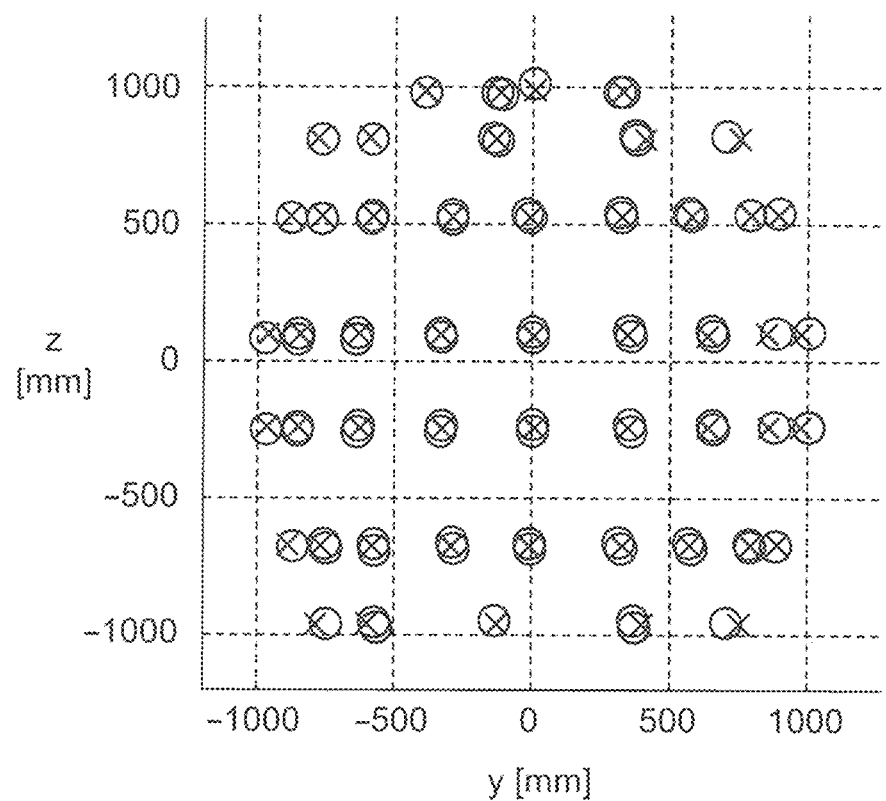
FIG. 10C is a diagram showing a result of the loudspeaker position estimation with the first embodiment.

FIGS. 10A, 10B, and 10C show a result of the experimental test. Those figures show the result viewed from straight above, straight in front, and laterally (from a direction rotated horizontally by 90 degrees from the front direction), respectively. In the figures, actual positions of the loudspeakers are denoted by X and position estimation results are denoted by O.

In addition, gaps between the actual positions and the positions from the position estimation are obtained, and the average thereof is determined as an error estimation value [mm]. In this test, the error estimation value is 23.5486 [mm]. Comparing this value with the value 4.8746 [mm] of the microphone position estimation experimental test performed in the identical experimental circumstance, it is found that a greater error has occurred. However, when the size of a loudspeaker unit (size of a diaphragm, for example), a distance between the disposed loudspeaker units, largeness of a speaker array or the like are taken into consideration, the present experimental result shows that the loudspeaker position estimation indicates satisfactory accuracy for checking the arrangement of loudspeakers and right or wrong of cable connections.

3. Second Embodiment

3-1. Configuration

The second embodiment of the present invention is an object position estimating apparatus, of which portability is improved compared to the first embodiment and, hence, it makes it possible to check easily and precisely an arrangement of a microphone array or cable connections at various sound recording scenes.

Figure 11:
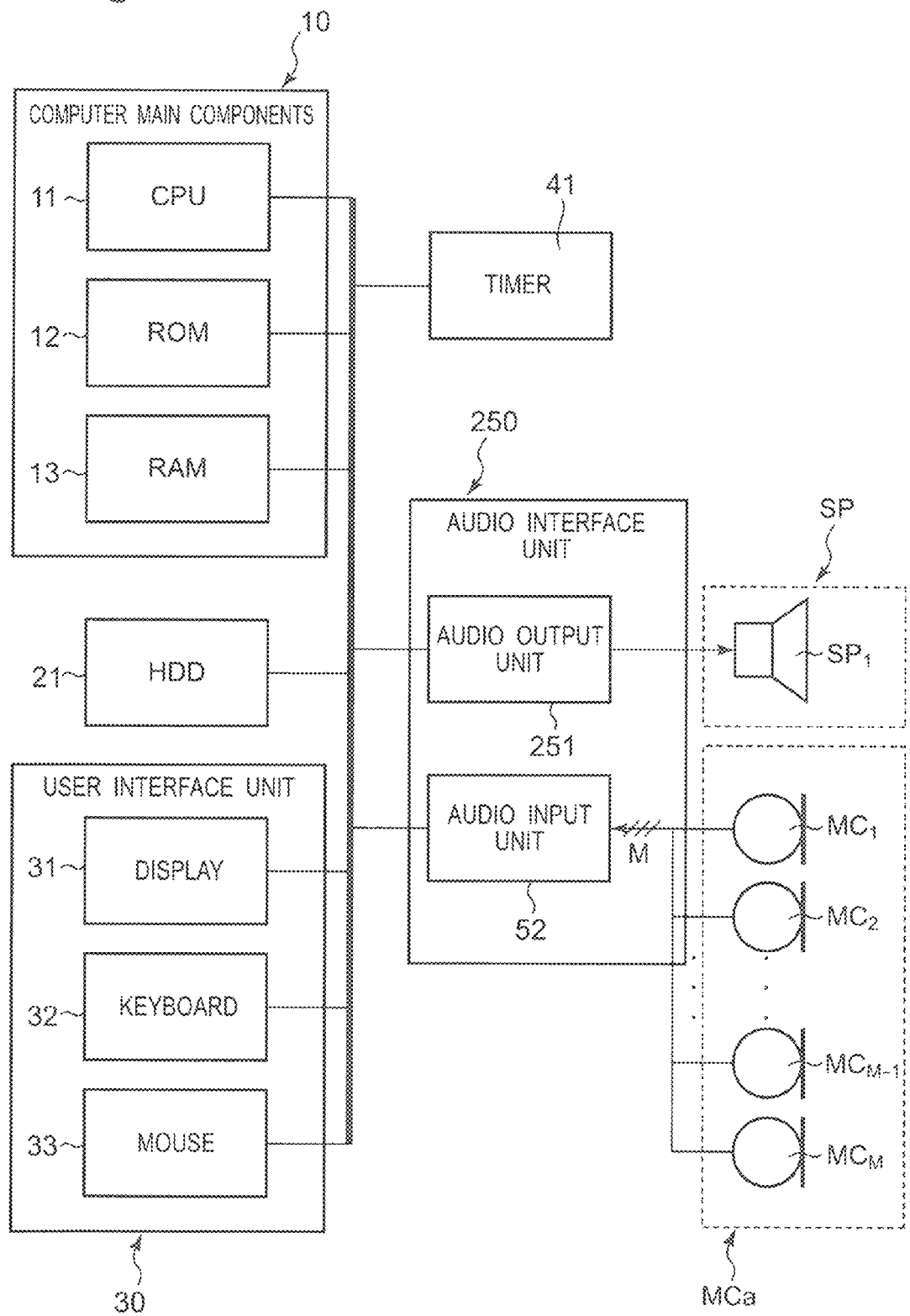
FIG. 11 is a block diagram of a hardware configuration of an object position estimating apparatus according to a second embodiment.
Figure 12:
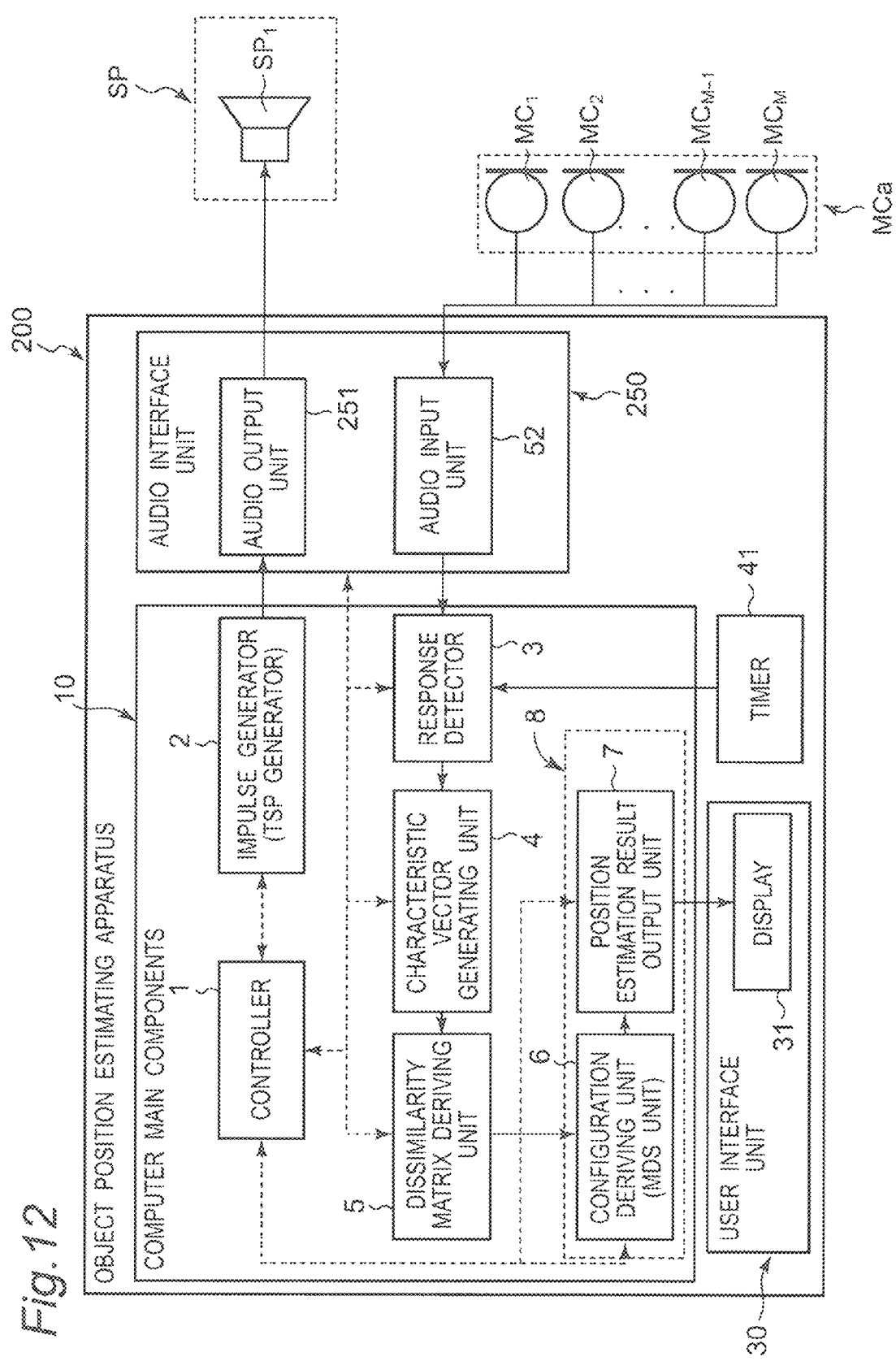
FIG. 12 is a diagram of a configuration of the object position estimating apparatus according to the second embodiment.

FIGS. 11 and 12 are block diagrams showing a configuration of an object position estimating apparatus according to the second embodiment. The object position estimating apparatus according to the second embodiment may include equivalent components to the apparatus according to the first embodiment, but differs from the object position estimating apparatus according to the first embodiment in that a single external loudspeaker SP ($SP_1$) is connected with an audio output unit 251 included in an audio interface unit 250. The loudspeaker SP may be a compact-type loudspeaker with superior portability (audio-technica AT-SPG50, for example).

3-2. Operations in Microphone Position Estimation

In the present embodiment, a single loudspeaker $SP_1$ is used to output a predetermined acoustic wave, and, after the output, the loudspeaker $SP_1$ is moved in order that the loudspeaker $SP_1$ can emit the acoustic waves at a plurality of positions. With respect to respective acoustic waves, response waveforms are detected by M microphones $MC_j$ (j: 1 to M) respectively so that the acoustic wave arrival time is determined. In this manner, the present embodiment causes the loudspeaker $SP_1$ to emit the acoustic waves at N positions, and, similarly to the first embodiment, an N dimensional characteristic vector is generated for each of the microphones $MC_j$ (j: 1 to M) by means of scales measuring closeness to N reference points. It is to be noted that, in the present embodiment, the number of loudspeakers is not limited to one. Plural loudspeakers may be used.

The object position estimating apparatus according to the present embodiment measures arrival time of a predetermined acoustic wave at each microphone $MC_j$ (J: 1 to M) from a single loudspeaker $SP_1$, and, in total, measures the arrival time of the predetermined acoustic wave from N points at each microphone $MC_j$ (j: 1 to M). The N points here correspond to the above mentioned reference points. Then, the characteristic vector generating unit 4 generates a characteristic vector $p_{MCj}$ (j: 1 to M) for each microphone $MC_j$ (j: 1 to M) as is the case in the first embodiment.

Similar to the first embodiment, the dissimilarity matrix deriving unit 5 derives a dissimilarity matrix D from the generated characteristic vector $p_{MCj}$ (j: 1 to M), and the estimation unit 8 (the configuration deriving unit 6 and the position estimation result output unit 7) estimates and outputs positions in the real space of M microphones from the dissimilarity matrix D.

As described above, the object position estimating apparatus according to the second embodiment shows superior portability compared to the object position estimating apparatus according to the first embodiment since the second embodiment is free from the use of a large-scale speaker array SPa. Thus, the second embodiment is advantageous in that the microphone position estimation is permitted in a variety of sound recording scenes.

3-3. Result of Microphone Position Estimation Experiment

Below, a result of a microphone position estimation experiment with the object position estimating apparatus according to the present embodiment will be described.

Figure 13:
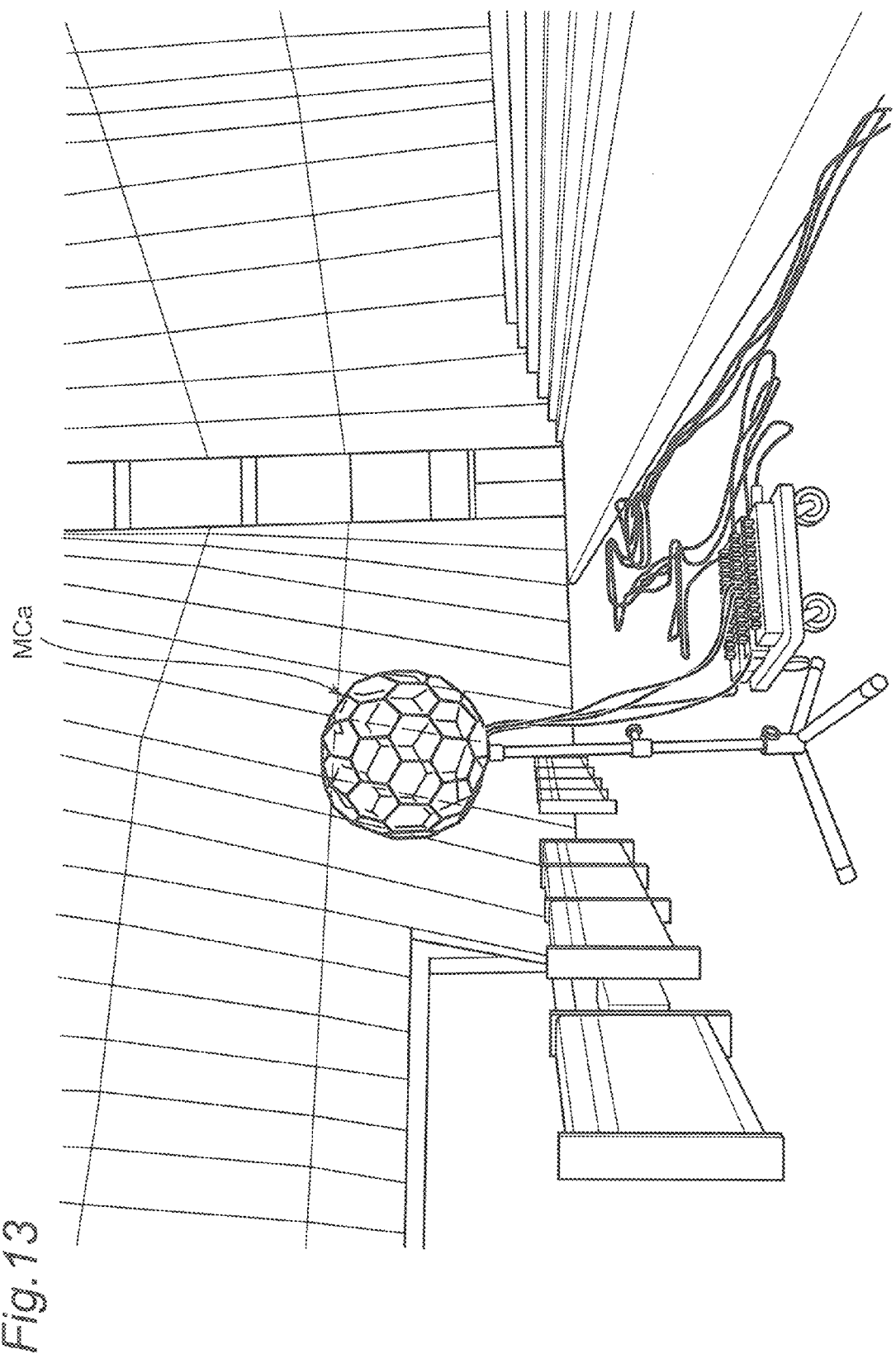
FIG. 13 is a diagram showing an experimental environment of a microphone position estimation experiment with the second embodiment.

As shown in FIG. 13, the present experimental test is conducted at the St. Mary's Cathedral, Tokyo under the circumstance in which an 80-ch microphone array MCa is disposed in the vicinity down from the altar, and a loudspeaker $SP_1$ (not shown) (audio technica AT-SPG50) is held by hands and carried around over various positions and an acoustic wave is emitted therefrom. In the experimental test, the conditions for outputting and detecting an acoustic wave are set such that: a TSP length is 8192 [pnt]; a TSP response length is 105600 [pnt]; a sampling frequency is 48000 [Hz]; and a quantization bit rate is 16 [bit].

Figure 14A:
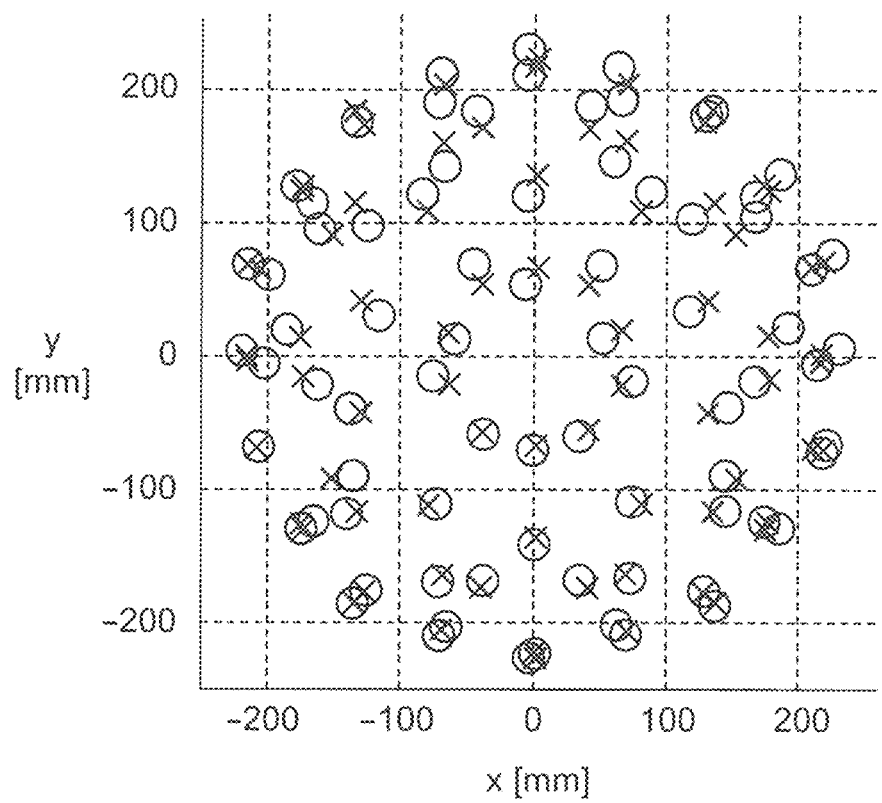
FIG. 14A is a diagram showing a result of the microphone position estimation with the second embodiment.
Figure 14B:
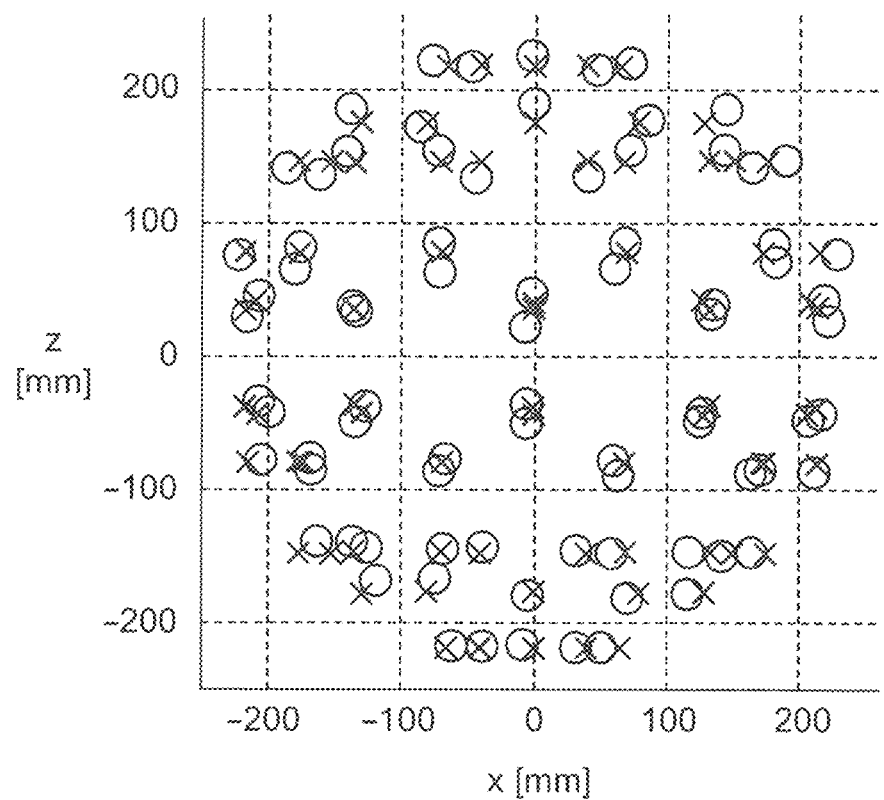
FIG. 14B is a diagram showing a result of the microphone position estimation with the second embodiment.
Figure 14C:
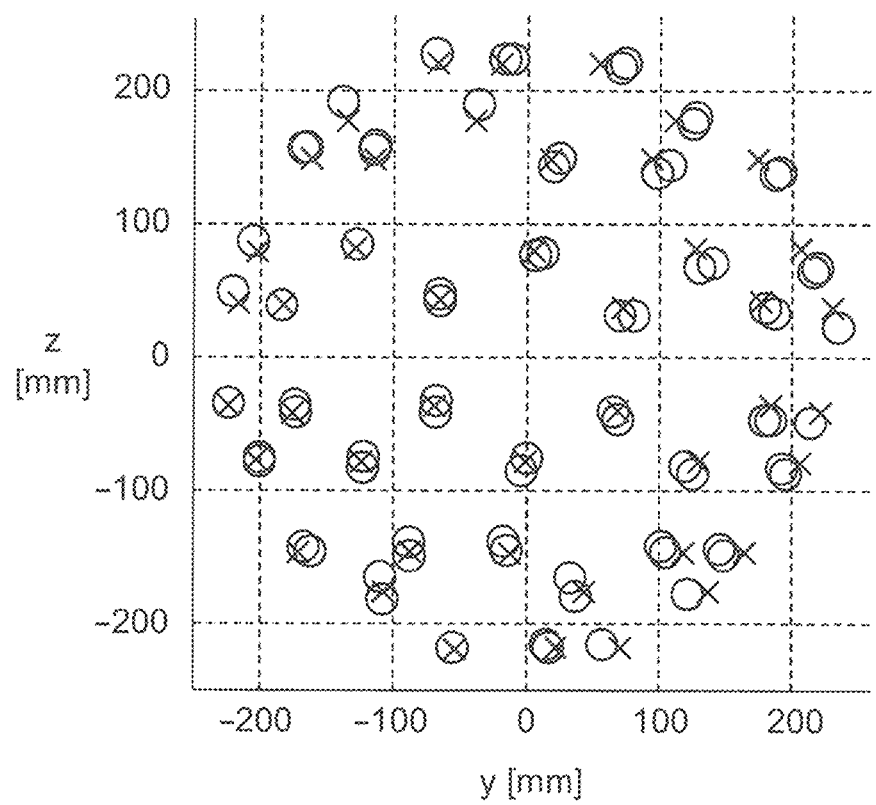
FIG. 14C is a diagram showing a result of the microphone position estimation with the second embodiment.

FIGS. 14A, 14B, and 14C show a result of the test. Those figures show the result viewed from straight above, straight in front, and laterally (from a direction rotated horizontally by 90 degrees from the front direction), respectively. In the figures, actual positions of the microphones are denoted by X and position estimation results are denoted by O.

In addition, gaps between the actual positions and the positions from the position estimation are obtained, and the average thereof is determined as an error estimation value [mm]. In this test, the error estimation value is 13.5148 [mm], which is an average over multiple experimental tests. From this test result, it is found that the object position estimating apparatus according to the present embodiment is capable of outputting an estimation result with satisfactory accuracy for checking the arrangement of microphones and right or wrong of cable connections.

3-4. Relation Between Estimation Error and Number of Loudspeaker's Sound Emission in the Microphone Position Estimation Below, relationship between the number of acoustic wave (impulse waveform (TSP waveform)) emissions by the loudspeaker (that is, the number of positions at which the acoustic wave is outputted (above mentioned reference points)) and the accuracy of the result of the object position estimation in the method for object position estimation according to the present embodiment will be described.

Figure 15:
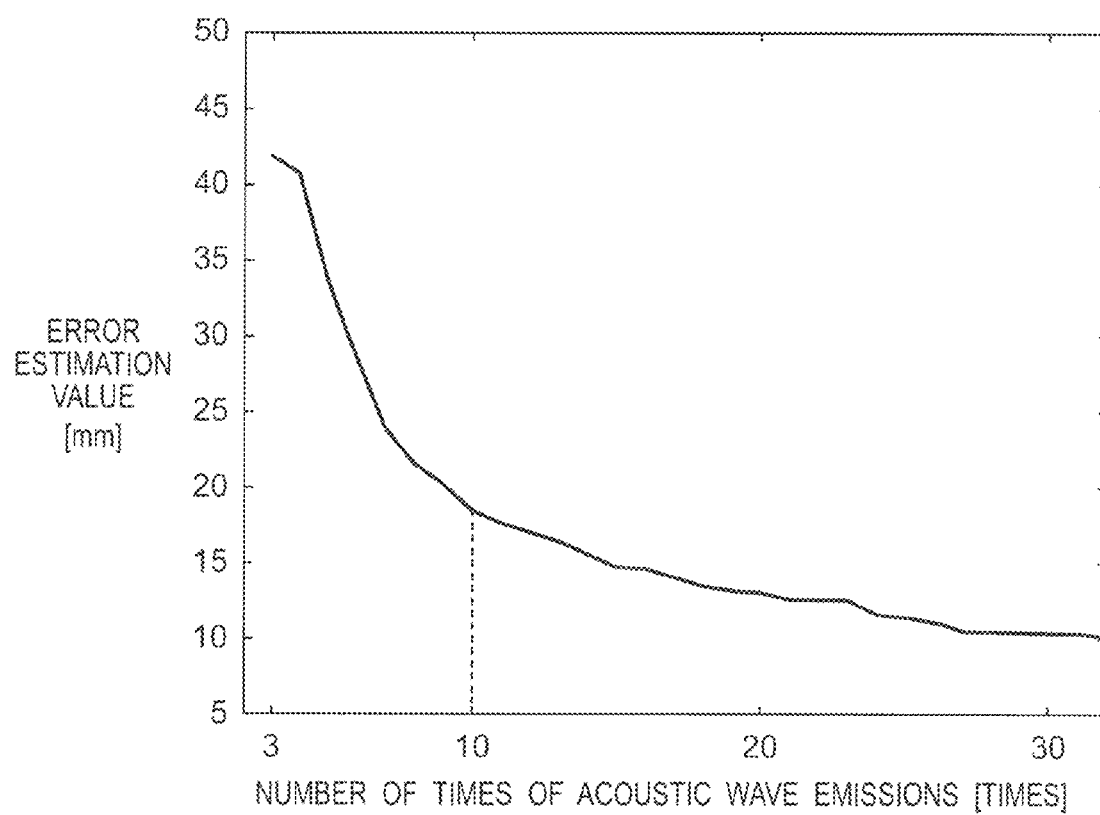
FIG. 15 is a diagram of a relationship between accuracy of the estimation results and the number of times of sound-emissions by a loudspeaker in the microphone position estimation with the second embodiment.

For investigating the relationship between the number of loudspeaker's acoustic wave emissions and the accuracy of the object position estimation, a number of experimental tests are conducted while the number of emissions is varied. It is to be noted that the positions at which the acoustic waves are emitted are different for respective emissions. In short, the number of loudspeaker's emissions corresponds to the number of the above mentioned reference points. FIG. 15 is a graph in which the results are plotted with the horizontal axis as the number of acoustic wave emissions and the vertical axis as the above mentioned error estimation values for estimation results. As can be seen from FIG. 15, also in the present embodiment, the accuracy of the object position estimation is enhanced monotonically as the number of the acoustic wave emissions used for the object position estimation (the number of the above mentioned reference points) increases. Especially, as the number of the loudspeakers is increased towards 10, the accuracy of the object position estimation is dramatically enhanced. From this, it can be found that, according to the object position estimation of the present embodiment, the object position estimation result is obtained with good accuracy even in the sound recording scene where a content is actually being created when the number of acoustic wave emissions (that is, the above mentioned reference points) is made approximately ten or more.

4. Variation of Object Position Estimating Apparatus

Below, variations to the object position estimating apparatus according to the first and second embodiments will be described. Variation 1 concerns another approach to generating a characteristic vector. Variation 2 concerns another approach to estimating configuration of objects from a dissimilarity matrix. The Variation 1 and Variation 2 are applicable to the object position estimating apparatus according to the first and second embodiments independently from each other and simultaneously.

4-1. Variation 1 (Another Approach to Characteristic Vector Generation)

Another approach to generating a characteristic vector will be described here. In the embodiments already described, a characteristic vector is generated based on the time (acoustic wave arrival time) when an acoustic wave that has been emitted from a loudspeaker located on a reference point arrives at a microphone. In contrast, in this approach, the characteristic vector is generated based on amplitude-frequency characteristics of an output signal outputted from the microphone.

Figure 16:
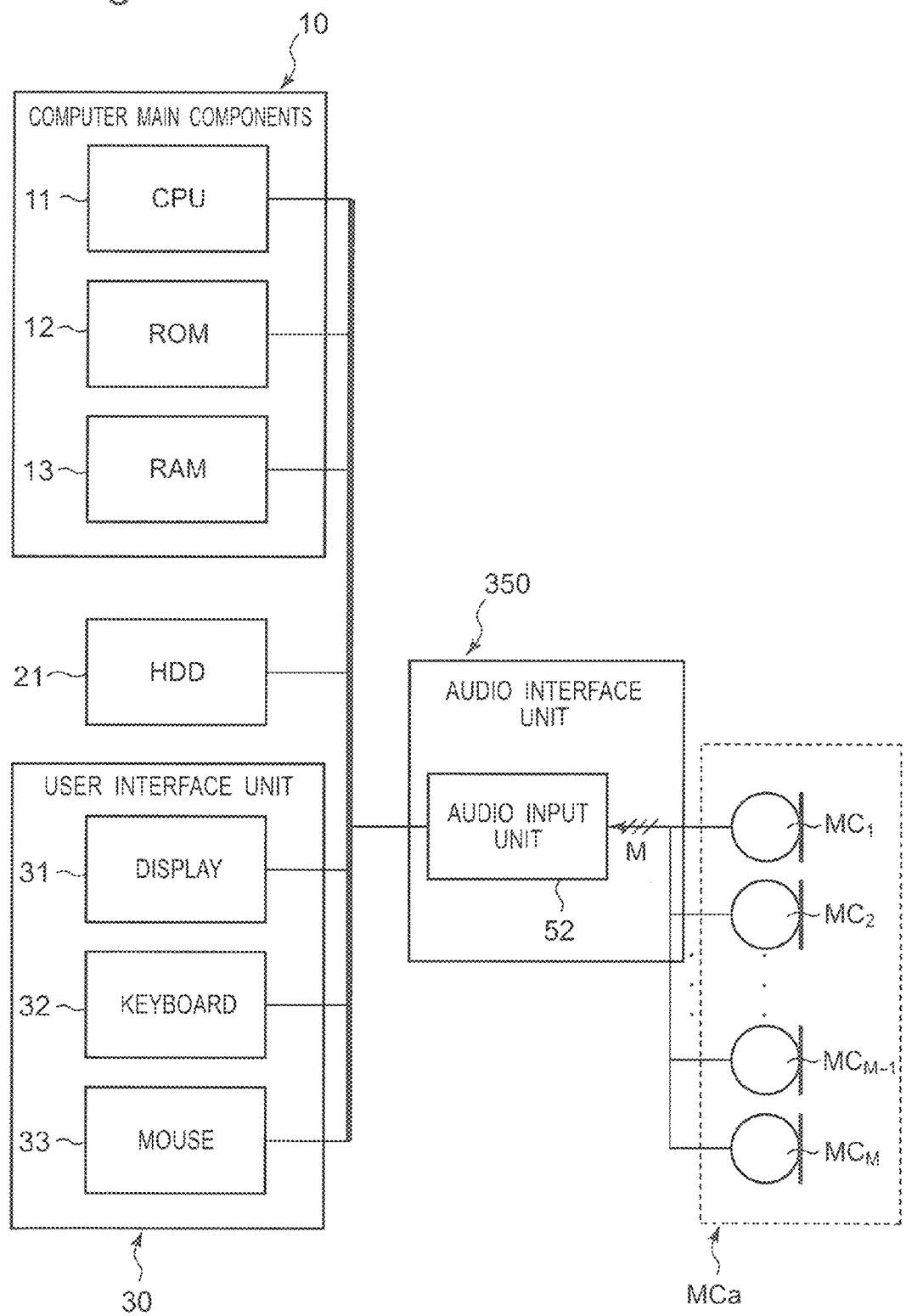
FIG. 16 is a block diagram of a hardware configuration of an object position estimating apparatus according to a variation 1.

FIG. 16 is a block diagram showing a configuration of a variation of the object position estimating apparatus. It is to be noted that constituent elements similar to those depicted in FIG. 1 etc. are depicted with similar reference numerals and descriptions thereof are omitted.

The variation of the object position estimating apparatus has a configuration, in which a timer 41 and an audio output unit 51 are omitted from the configuration of the object position estimating apparatus depicted in FIG. 1. The present apparatus does not have to be connected with a speaker array SPa which is composed of external loudspeakers ($SP_1$, $SP_2$, ..., $SP_N$).

Figure 17:
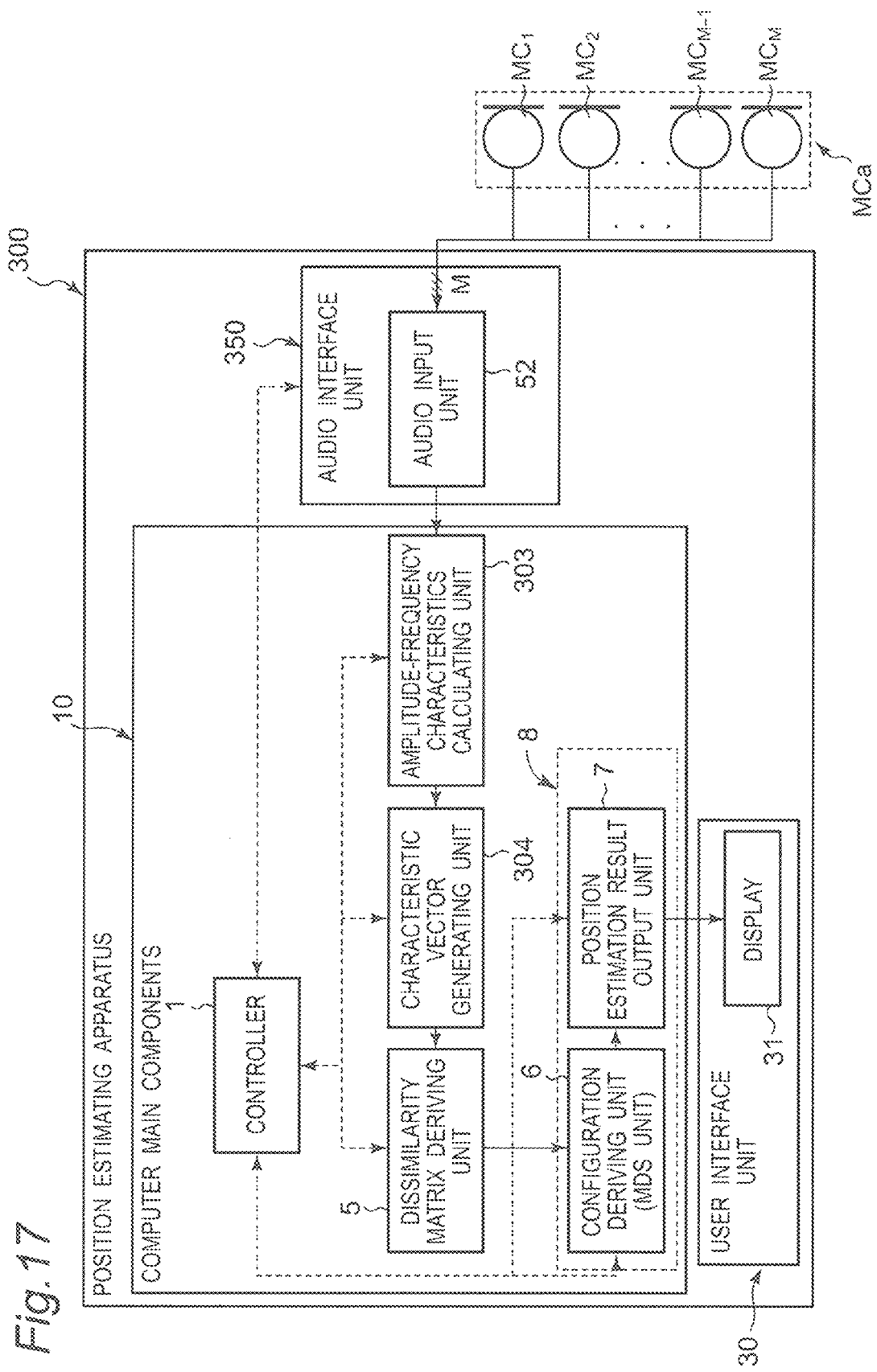
FIG. 17 is a diagram of a configuration of the object position estimating apparatus according to the variation 1.

FIG. 17 is a block diagram explicitly illustrating functional blocks realized by the computer main components 10 of the object position estimating apparatus 300. The CPU 11 of the computer main components reads out and executes an object position estimation program stored in the ROM 12 so that the CPU 11 is capable of operating as a controller 1, an amplitude-frequency characteristics calculating unit 303, a characteristic vector generating unit 304, a dissimilarity matrix deriving unit 5, a configuration deriving unit (MDS unit) 6, and a position estimation result output unit 7. The configuration deriving unit (MDS unit) 6 and the position estimation result output unit 7 constitute an estimation unit 8. The operations by the controller 1, the dissimilarity matrix deriving unit 5, the configuration deriving unit (MDS unit) 6, and the estimation unit 8 may be the same as those described in the first and second embodiments and, hence, descriptions thereof are omitted here.

The amplitude-frequency characteristics calculating unit 303 is realized when the CPU 11 executes the object position estimation program. The amplitude-frequency characteristics calculating unit 303 calculates amplitude-frequency characteristics of an output signal of each microphone ($MC_1$ to $MC_M$) included in the microphone array MCa.

The characteristic vector generating unit 304 is realized when the CPU 11 executes the object position estimation program. The characteristic vector generating unit 304 inputs the amplitude-frequency characteristics calculated by the amplitude-frequency characteristics calculating unit 303 and generates an N dimensional characteristic vector for each of the M microphones (objects). Below, it will be described in detail the case where the characteristic vector generating unit 304 obtains a difference of corresponding components of characteristic vectors of every two microphones among M microphones (objects) (difference between components of characteristic vectors of equation (1) $p_{i,j} - p_{i,k}$, k: k≠j, i: an arbitrary integer from 1 to N) based on the amplitude-frequency characteristics. However, a person skilled in the art will know from the descriptions below a technique for determining components themselves of a characteristic vector of each microphone.

It is to be noted that at least one of the controller 1, the amplitude-frequency characteristics calculating unit 303, the characteristic vector generating unit 304, the dissimilarity matrix deriving unit 5, the configuration deriving unit (MDS unit) 6, and the position estimation result output unit 7 may be implemented with a dedicated hardware circuitry.

Figure 18:
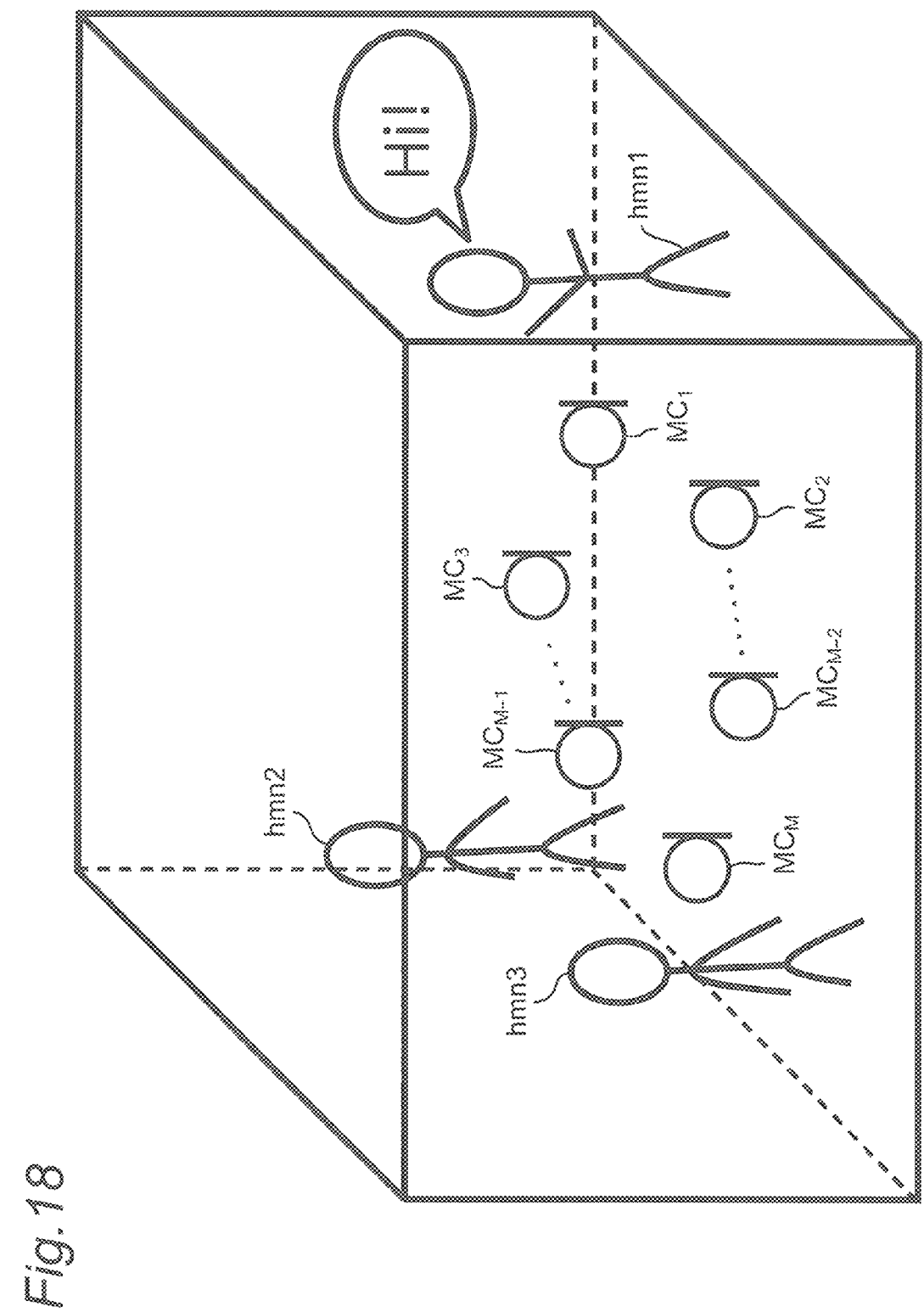
FIG. 18 is a schematic diagram illustrating a relationship between a group of microphones arranged in a room and people.

FIG. 18 is a schematic diagram illustrating a situation where three humans hmn1-hmn3 are having a meeting in a room. In the room, M microphones ($MC_1$ to $MC_M$) are disposed. The M microphones ($MC_1$ to $MC_M$) are connected to the object position estimating apparatus 300 not shown via the audio interface unit 350 not shown (see FIG. 17).

Figure 19:
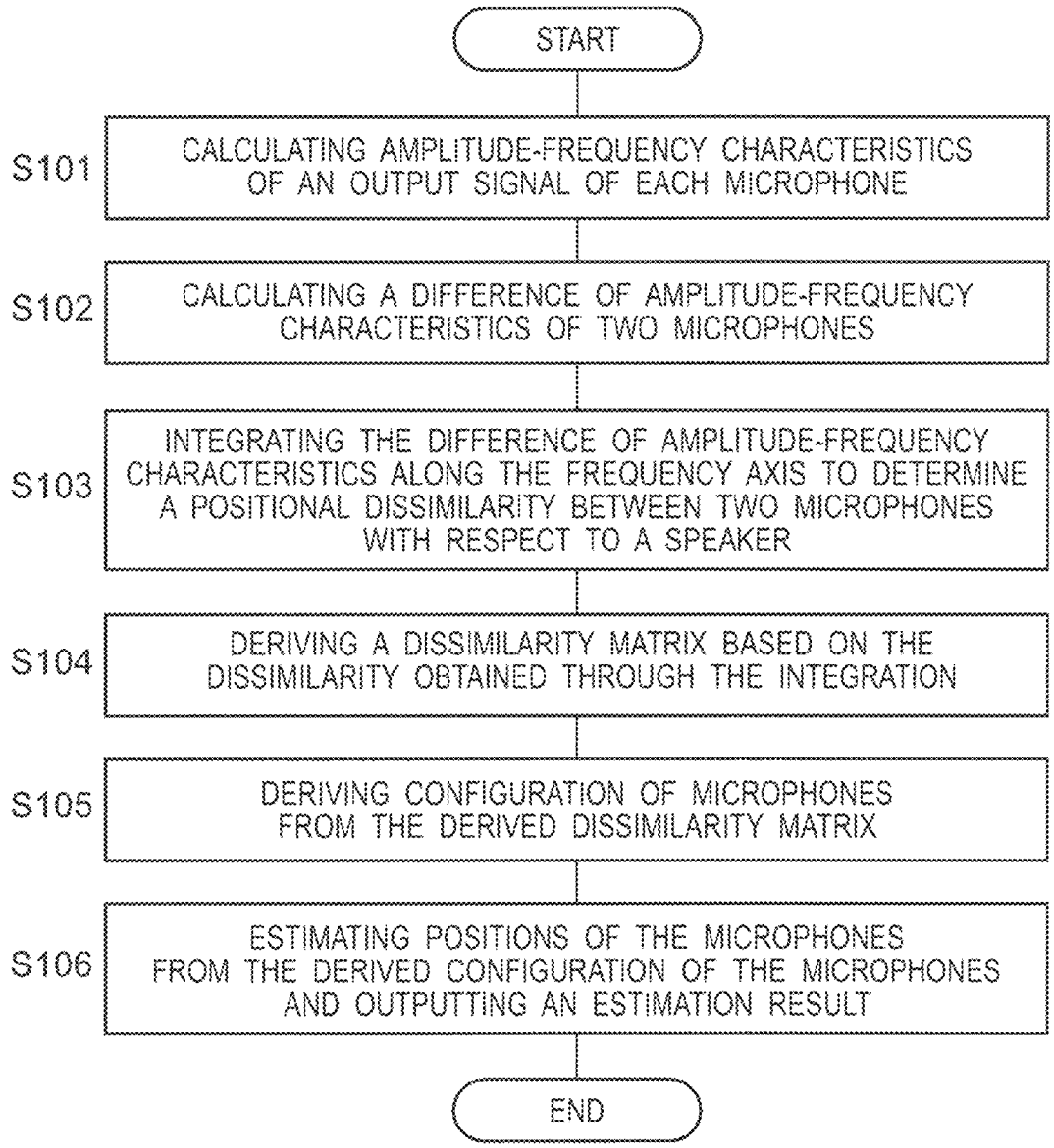
FIG. 19 is a flow chart of process performed by the object position estimating apparatus according to the variation 1.

FIG. 19 is a flowchart of processes for the microphone position estimation performed by the object position estimating apparatus 300.

The amplitude-frequency characteristics calculating unit 303 of the object position estimating apparatus 300 inputs output signals from the M microphones ($MC_1$ to $MC_M$) through the audio interface unit 350. These output signals correspond to response signals of the M microphones with respect to an ambient sound in the room. The amplitude-frequency characteristics calculating unit 303 extracts a portion in which a human voice is included in the ambient sound (for example, the portion including the voice "Hi!" by the speaker hmn1 in FIG. 18) from each of the output signals, and transforms the extracted output signals (time domain) of the M microphones ($MC_1$ to $MC_M$) into the frequency domain to calculate their amplitude-frequency characteristics of the output signals (frequency domain) (step S101). Information about the amplitude-frequency characteristics of the output signals of microphones ($MC_1$ to $MC_M$) are transferred to the characteristic vector generating unit 304 from the amplitude-frequency characteristics calculating unit 303.

The characteristic vector generating unit 304 calculates a difference between the amplitude-frequency characteristics of the output signals for every pair of two microphones ($MC_j$, $MC_k$) based on the information about the amplitude-frequency characteristics transferred from the amplitude-frequency characteristics calculating unit 303 (step S102).

Based on an integral value that is obtained through integrating the calculated difference between two amplitude-frequency characteristics along the frequency axis, the characteristic vector generating unit 304 obtains a dissimilarity between positions of two microphones with respect to a speaker (reference point). Namely, the characteristic vector generating unit 304 obtains, based on the integral value, a difference (corresponding to $p_{i,j} p_{i,k}$ in equation (1), k≠j, i: an arbitrary integer from 1 to N) between measurements of the two microphones on the scale defining closeness to the reference point.

Figure 20:
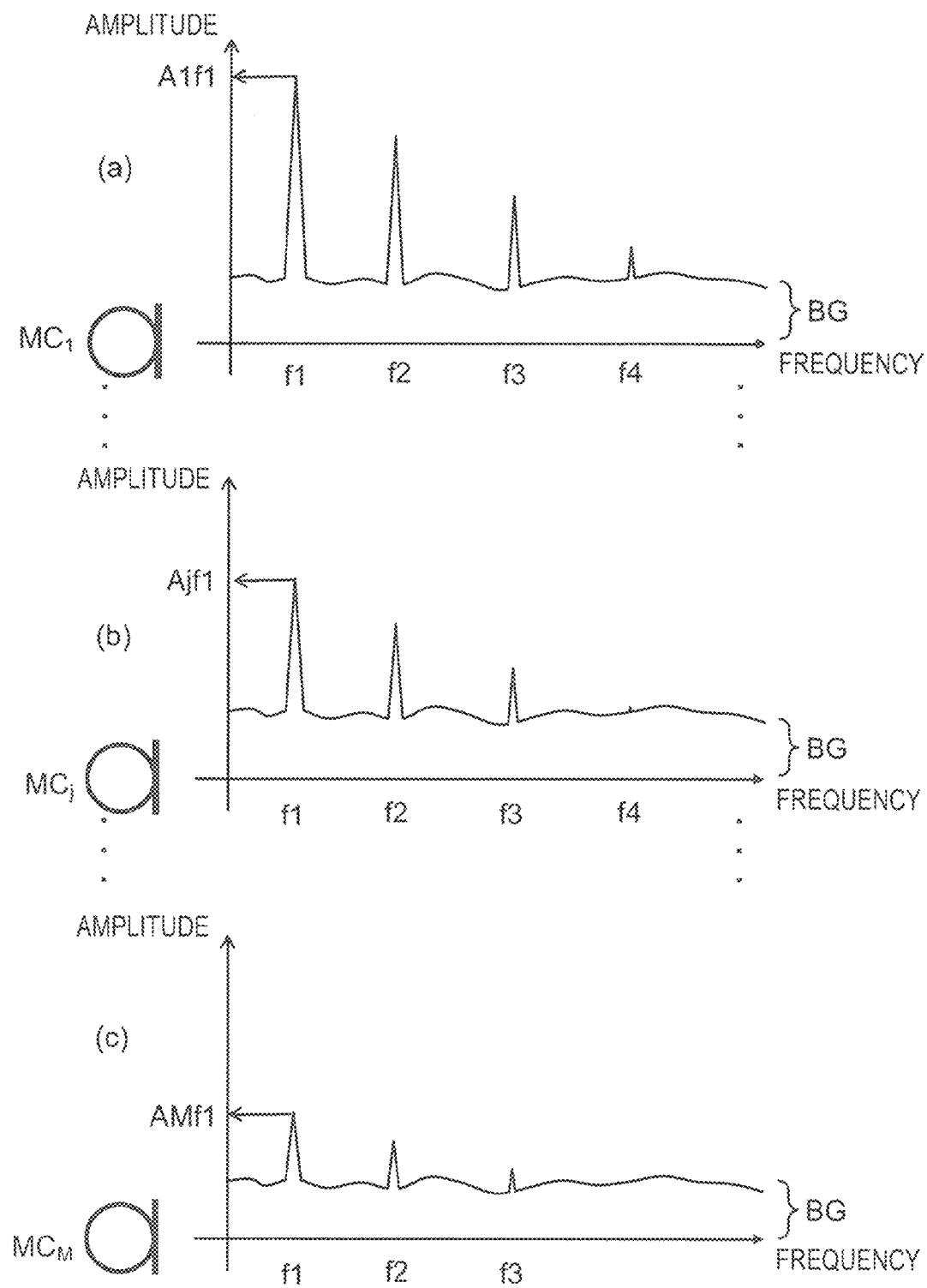
FIG. 20 is a diagram of an example of amplitude-frequency characteristics of a microphone output signal outputted from each of microphones when each of the microphones collects sound in which human voice is included.

FIG. 20 is a schematic diagram illustrating amplitude-frequency characteristics of output signals of respective microphones ($MC_1$ to $MC_M$). FIG. 20(*a*) is amplitude-frequency characteristics of an output signal from a microphone $MC_1$ regarding an ambient sound in a room illustrated in FIG. 18, which includes a human voice spoken by a human hmn1. In the same way, FIG. 20(*b*) and FIG. 20(*c*) are amplitude-frequency characteristics of output signals from microphones $MC_j$ and $MC_M$ regarding the same ambient sound including the same voice, respectively. In every amplitude-frequency characteristics, formants of the voice spoken by the human hmn1 appear superimposed onto noise components BG omnipresent in a sound recording environment (reverberant sounds in a room, bustle sounds in the open, etc.). Here, a central frequency of the first formant F1 is denoted by f1, and central frequencies of the second and higher formants are denoted by f2, f3, f4, respectively.

As can be seen from respective charts of FIG. 20, the noise components BG shows almost identical profiles in every output signal. In contrast, the shape of the formant components of the human voice deviates away from their original shape as the microphone recedes from the human. Accordingly, the characteristic vector generating unit 304 is capable of determining a difference of closeness to a speaker (reference point) between two microphones from the difference of shapes of the amplitude-frequency characteristics of the output signals of the two microphones.

The characteristic vector generating unit 304 integrates a difference of amplitude-frequency characteristics of output signals from two microphones ($MC_j$, $MC_k$, k: k≠j) along the frequency axis (step S103). The integral value obtained here corresponds to a difference between the microphone $MC_j$ and the microphone $MC_k$ with respect to closeness to a reference point (speaker). Namely, the integral value obtained here corresponds to a difference of components regarding the reference point in the characteristic vectors of the two microphones ($MC_j$, $MC_k$) ($p_{i,j}-p_{i,k}$ in equation (1), k≠j, i: an arbitrary integer from 1 to N).

It should be appreciated that the characteristic vector generating unit 304 is capable of determining the components themselves of each characteristic vector from the thus determined difference between the components related to the speaker (reference point) in the characteristic vectors of the two microphones.

As described, the characteristic vector generating unit 304 obtains a dissimilarity of positions of two microphones with respect to each reference point (a difference between corresponding components of characteristic vectors) for every pair of two microphones ($MC_1$ to $MC_M$) in step S103.

Next, in step S104, the dissimilarity matrix deriving unit 5 derives a dissimilarity matrix D (equation (3)) based on the differences between corresponding components of every pair of two characteristic vectors, which are determined by the characteristic vector generating unit 304.

It is to be noted that the characteristic vector generating unit 304 may obtain a characteristic vector of each microphone from the integral value obtained in step S103 and output the same to the dissimilarity matrix deriving unit 5. In such a case, the dissimilarity matrix deriving unit 5 may derive the dissimilarity matrix in step S104 in a similar way to step S7 in the previous embodiments.

Processes in step S105 and step S106 may be identical to those described in the previous embodiments (step S8 and step S9 in FIG. 4) and, hence, the descriptions thereto are omitted here.

It is to be noted that the number of reference points is required to be three or more similarly to the previous embodiments. Accordingly, the object position estimating apparatus collects voices spoken by a speaker(s) at N points of positions (N being three or more) which differ from each other by means of M microphones and derives a dissimilarity matrix D with the use of output signals, which have been collected and outputted by the respective microphones (step S104). The human who speaks at the N points of positions does not have to be the same person.

Alternatively, the characteristic vector generating unit 304 may generate a characteristic vector based on the information about the amplitude-frequency characteristics transferred from the amplitude-frequency characteristics calculating unit 303 in the way described below. Firstly, the characteristic vector generating unit 304 identifies formants of a speaker in the output signals from the microphones ($MC_1$ to $MC_M$). In the identification, the characteristic vector generating unit 304 may determine the amplitudes of the identified formants (the first formants F1, for example). Then, the characteristic vector generating unit 304 may determine a measurement on a scale measuring closeness to a reference point (human hmn1) for each microphone ($MC_1$ to $MC_M$) from a ratio (in units of dB, for example) of a peak amplitude of a specific formant (first formant F1 having a central frequency of f1, for example) appearing on the amplitude-frequency characteristics of an output signal from each microphone ($MC_1$ to $MC_M$) to a peak amplitude (an amplitude A1f1 in FIG. 20(*a*)) of the specific formant appearing on the amplitude-frequency characteristics of an output signal from one arbitrary microphone (MC1, for example).

For example, if the ratio of a peak amplitude AMf1 of a first formant F1 on the amplitude-frequency characteristics of an output signal from a microphone $MC_M$ to the peak amplitude A1f1 of the first formant F1 on the amplitude-frequency characteristics of the output signal from the microphone $MC_1$ as the one arbitrary microphone is −6 decibels, the measurement for the microphone $MC_1$ on a scale measuring closeness to a human hmn1 as a reference point may be defined as 1 and the measurement for the microphone $MC_M$ on the scale measuring closeness to the reference point (human hmn1) may be evaluated as 2, for example.

As described above, the characteristic vector generating unit 304 is capable of determining a characteristic vector of each microphone ($MC_1$ to $MC_M$) based on the specific frequency component in the amplitude-frequency characteristics.

As can be seen, in the present variation, the object position estimating apparatus 300 does not have to emit a particular acoustic wave. In addition, the present variation is especially beneficial to the object position estimation in a room having an acoustic property under which enriched reverberant sounds can be produced or in a bustle.

Also in the present variation, it is possible to estimate a positional relationship among a plurality of human beings, as the positions of loudspeakers estimated in the previous embodiments. In short, in the present variation, it is possible to consider a human who makes a voice as a position estimation target object and estimate the position of the human.

4-2. Variation 2 (Another Approach to Object Configuration Estimation)

Another approach to estimating a configuration based on a dissimilarity matrix will be described below. In the embodiments already described, an estimation unit 8 having a configuration deriving unit 6 (FIG. 2, etc.) estimates the configuration of objects by applying the MDS method to the dissimilarity matrix. In addition to this, it is also possible to estimate the configuration of objects by means of an approach other than the MDS method.

For example, the configuration deriving unit 6 (FIG. 2, etc.) may obtain (an approximate solution of) the configuration by numerically solving a so-called combinatorial optimization problem by means of a full search technique. To be more precise, the configuration deriving unit 6 (FIG. 2, etc.) may evaluate, for every possible configurations (configuration approximate solution candidates) of objects (M microphones, for example), a suitability for a configuration approximate solution based on the dissimilarity matrix, and output the configuration approximate solution candidate that has been the most highly evaluated as the configuration estimation result.

Alternatively, the configuration deriving unit 6 (FIG. 2, etc.) may obtain (an approximate solution of) the configuration by solving numerically a so-called combinatorial optimization problem by means of a local search technique with the aid of an algorithm such as a so-called genetic algorithm, for example. To be more precise, the configuration deriving unit 6 (FIG. 2, etc.) may evaluate, for some possible configurations (configuration approximate solution candidates) of objects (M microphones, for example), a suitability for a configuration approximate solution based on the dissimilarity matrix, and output the configuration approximate solution candidate that has been the most highly evaluated as the configuration estimation result.

Similarly to the embodiments described above, also in the present variation, information about a position of a position estimation target object and a position of a reference point is not necessary for estimating the positions of the objects. However, in the case where the object positions are estimated using a full-search or a local-search technique like the present variation, preliminary condition setting on possible positions of position estimation target objects or reference points and reduction of possible configurations of the objects (configuration approximate solution candidates) under the condition contribute to speeding up the derivation of the configuration approximate solution based on a dissimilarity matrix by the configuration deriving unit 6.

Below, an effective technique will be described. This technique is especially effective when the configuration approximate solution is numerically solved in accordance with a dissimilarity matrix by means of a full-search or a local-search technique.

By setting a minimum distance between two adjacent position estimation target objects for the position estimation target objects, possible positions for the objects are discretized. Using the minimum distance $d_{min}$ as the condition for possible positions of position estimation target objects, the number of possible configuration approximate solution candidates is reduced so that the configuration approximate solution derivation can be accelerated. Further, by confining a spatial range where the object can exist using information about a distance between an arbitrary one reference point and the object which is closest to the one reference point and a distance between the one reference point and the object which is most distant from the one reference point, the number of configuration approximate solution candidates can be drastically reduced.

In the embodiments 1 and 2 described above, the time when an acoustic wave emitted from a loudspeaker disposed at a reference point arrives at each microphone (acoustic wave arrival time) is specified to generate a characteristic vector. In the present variation, the time when the acoustic wave is emitted by a loudspeaker disposed at a reference point may be additionally specified so that the amount of time required for the acoustic wave to arrive at each microphone (acoustic wave travel time) can be obtained.

Of the acoustic wave travel time to respective objects (microphones) from a loudspeaker disposed at a certain reference point, the microphone that has marked the shortest acoustic wave travel time is the microphone closest to the certain reference point, and the microphone that has marked the longest acoustic wave travel time is the microphone most distant from the certain reference point. Here, letting a minimum distance $R_{min}$ and a maximum distance $R_{max}$ be a product of the shortest acoustic wave travel time and the speed of sound and a product of the longest acoustic wave travel time and the speed of sound, respectively, the possible positions for all position estimation target objects (microphones) are confined within a range where the distance from the reference point is more than or equal to $R_{min}$ and less than or equal to $R_{max}$.

Figure 21:
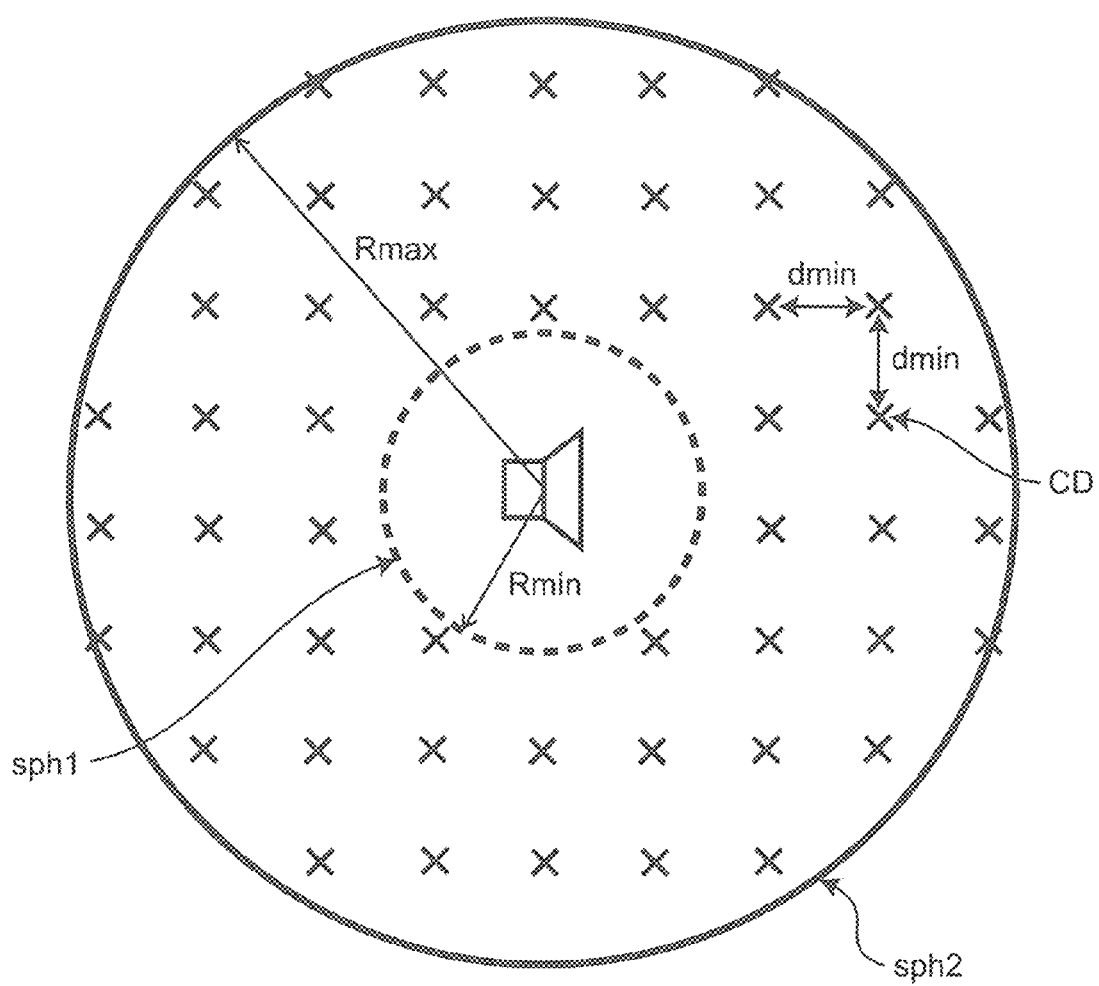
FIG. 21 is a diagram of an example of a distribution of the object position candidates according to a variation 2 of the object position estimating apparatus.

FIG. 21 is a diagram illustrating object position candidates CD (x in the figure) in the case where the minimum distance of objects $d_{min}$, the shortest distance to a certain reference point $R_{min}$, and the longest distance from the certain reference point $R_{max}$ are provided as the condition on possible positions of position estimation target objects. The object position candidates CD are distributed at intervals of the minimum distance $d_{min}$ within a range outside a sphere sph1 of radius $R_{min}$ centered at a certain reference point (loudspeaker in the figure) and inside a sphere sph2 of radius $R_{max}$ centered at the same reference point. In this case, the configuration deriving unit 6 (FIG. 2, etc.) may evaluate a suitability for a configuration approximate solution of each configuration approximate solution candidate that consists of candidates corresponding to the number of the objects (M candidates) chosen from the object position candidates CD based on a dissimilarity matrix. Then, the configuration deriving unit 6 may consider the configuration approximate solution candidate which has received a good evaluation as a configuration approximate solution. In the case where the full-search technique is employed, the suitability of all possible configuration approximate solution candidates may be evaluated. In the case where the local-search technique is employed, configuration approximate solution candidates to be evaluated may be selected according to well-known algorithms (genetic algorithm, etc.).

The suitability evaluation may be performed as follows. First, a distance between objects in a configuration approximate solution candidate to be evaluated is calculated and, based on the calculation result, a distance matrix of which elements are the distance between the objects is derived. Then, it is possible to evaluate the suitability by estimating a degree of similitude between the calculated distance matrix and a dissimilarity matrix. In short, it is possible to evaluate the suitability of a configuration approximate solution candidate by more highly rating a distance matrix of which relationship with the dissimilarity matrix approaches more closely to a proportional relationship.

Figure 22:
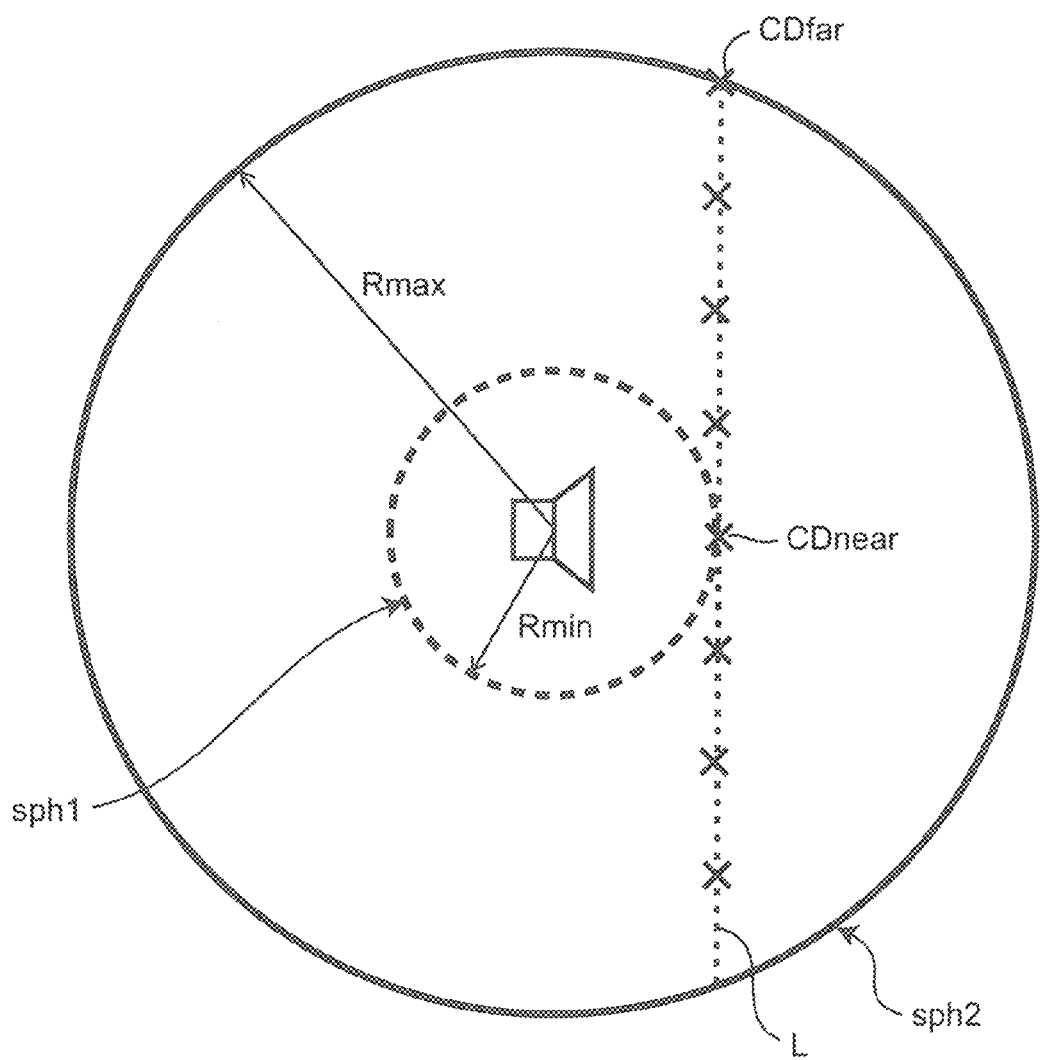
FIG. 22 is a diagram of an example of a distribution of the object position candidates according to the variation 2 of the object position estimating apparatus.

It is possible to further include a condition regarding a formation of an arrangement of objects as the condition for possible positions of position estimation target objects. FIG. 22 is a diagram illustrating object position candidates CD (x in the figure), in which a further condition that the microphones as the objects should constitute a linear shape microphone array is added. In this case, the object position candidates CD are distributed only on a straight line L that touches the sphere sph1 at the candidate $CD_{near}$. In addition, it is extremely highly possible that the microphone that has marked the shortest acoustic wave travel time and the microphone that has marked the longest acoustic wave travel time be located on the candidate $CD_{near}$ and a candidate $CD_{far}$ on a surface of the sphere sph2, respectively. Accordingly, it is possible to accelerate the derivation of a configuration approximate solution by selecting a configuration approximate solution candidate including such an arrangement and performing a local-search thereto. In addition, it is possible to further accelerate the derivation of a configuration approximate solution by selecting a configuration approximate solution candidate in which a microphone having a measurement similar to the measurement of the microphone disposed at the candidate $CD_{near}$ is disposed at a candidate near the candidate $CD_{near}$ with respect to the scale measuring closeness to the reference point in the characteristic vector and performing a local-search thereto. This can be applied to the candidates near the candidate $CD_{far}$ as well.

Figure 23:
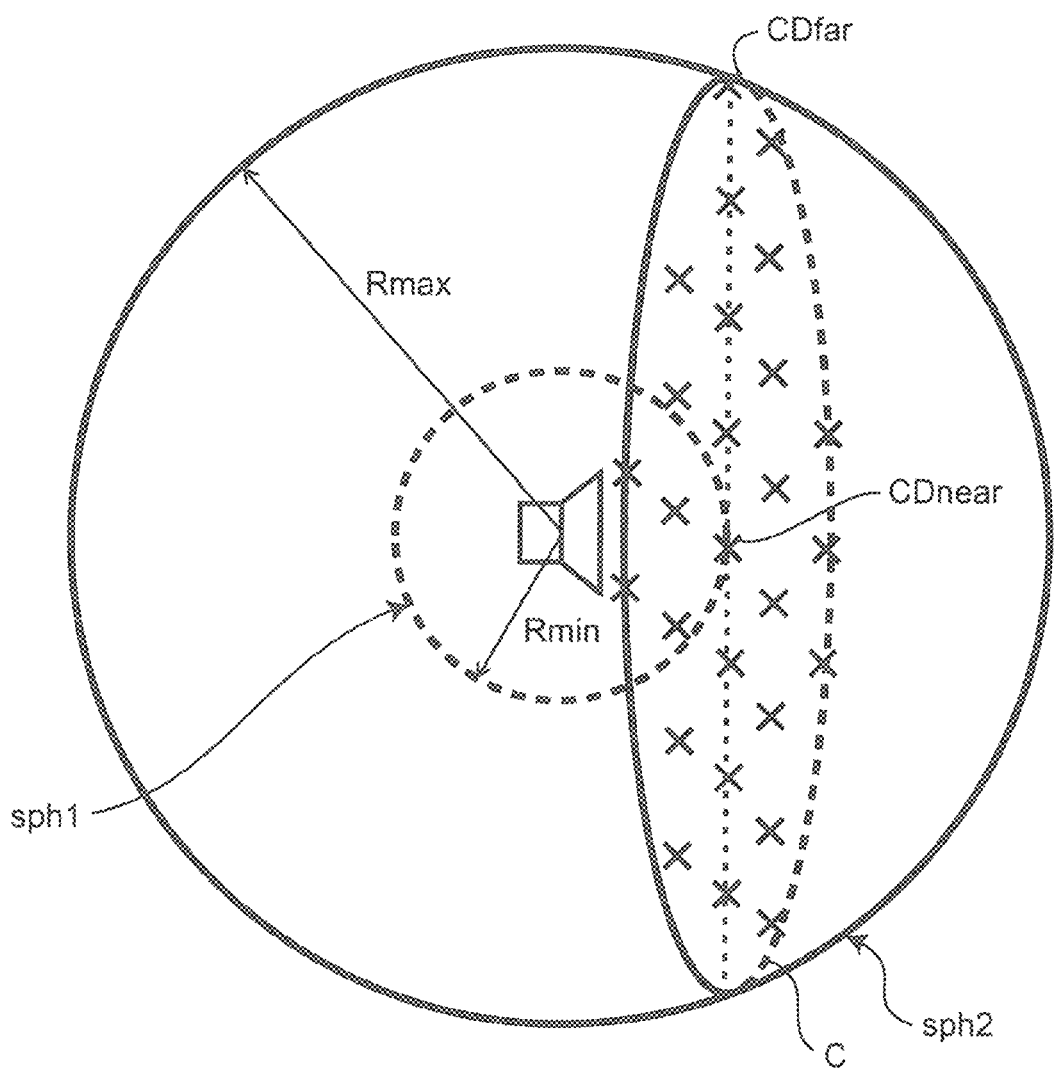
FIG. 23 is a diagram of an example of a distribution of the object position candidates according to the variation 2 of the object position estimating apparatus.

FIG. 23 is a diagram illustrating object position candidates CD (x in the figure), in which a further condition that the microphones as the objects should constitute a planar shape microphone array is added. In this case, the object position candidates CD are distributed only on a circle C that touches the sphere sph1 at the candidate $CD_{near}$. In addition, it is extremely highly possible that the microphone that has marked the shortest acoustic wave travel time and the microphone that has marked the longest acoustic wave travel time be located on the candidate $CD_{near}$ and a candidate $CD_{far}$ on a surface of the sphere sph2, respectively. Accordingly, it is possible to accelerate the derivation of a configuration approximate solution by selecting a configuration approximate solution candidate including such an arrangement and performing a local-search thereto.

Figure 24:
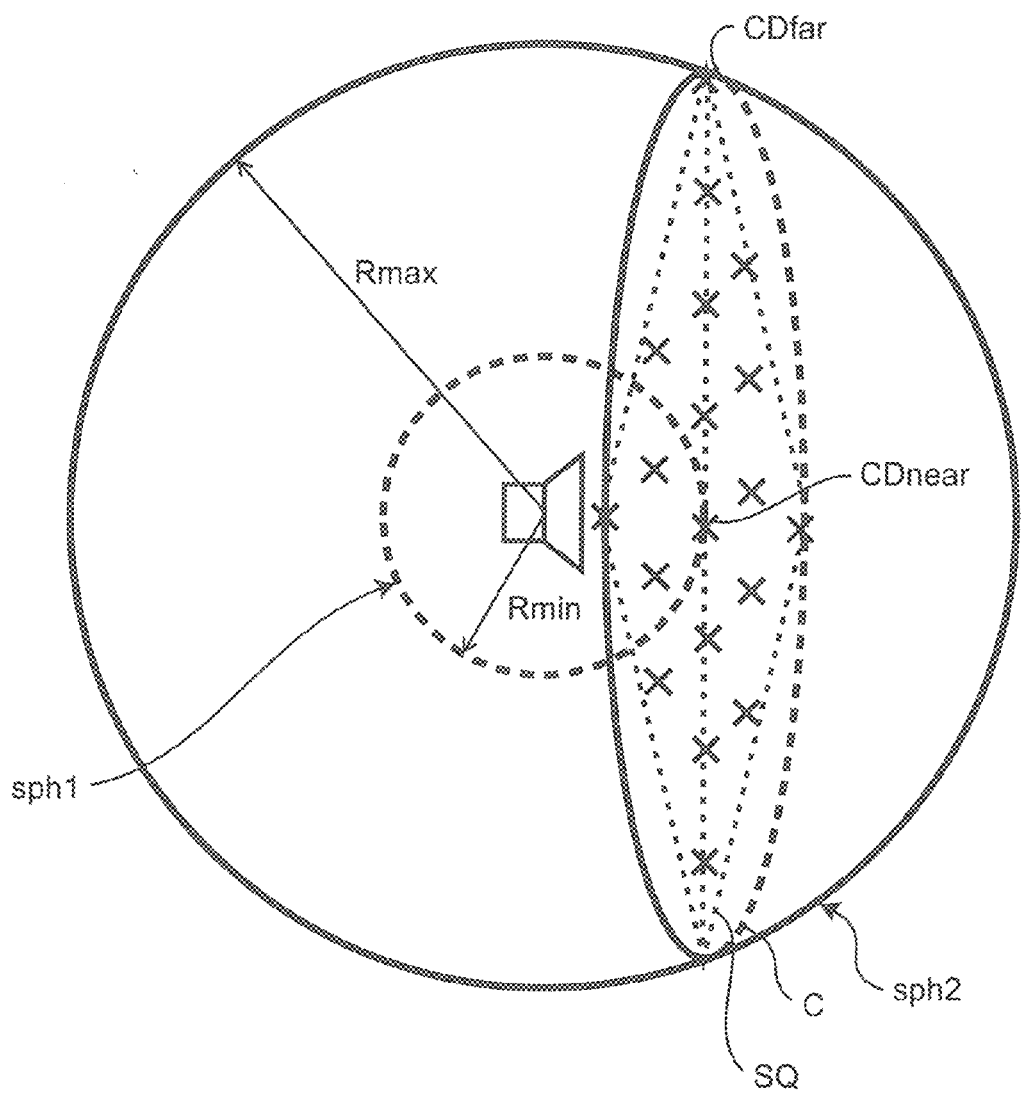
FIG. 24 is a diagram of an example of a distribution of the object position candidates according to the variation 2 of the object position estimating apparatus.

FIG. 24 is a diagram illustrating object position candidates CD (x in the figure), in which a further condition that the microphones as the objects should constitute a regular square shape microphone array is added. In this case, the object position candidates CD are distributed only on a regular square SQ that is inscribed in a circle C which touches the sphere sph1 at the candidate $CD_{near}$. In addition, it is extremely highly possible that the microphone that has marked the shortest acoustic wave travel time and the microphone that has marked the longest acoustic wave travel time be located on the candidate $CD_{near}$ and a candidate $CD_{far}$ on a surface of the sphere sph2, respectively. Accordingly, it is possible to accelerate the derivation of a configuration approximate solution by selecting a configuration approximate solution candidate including such an arrangement and performing a local-search thereto.

Figure 25:
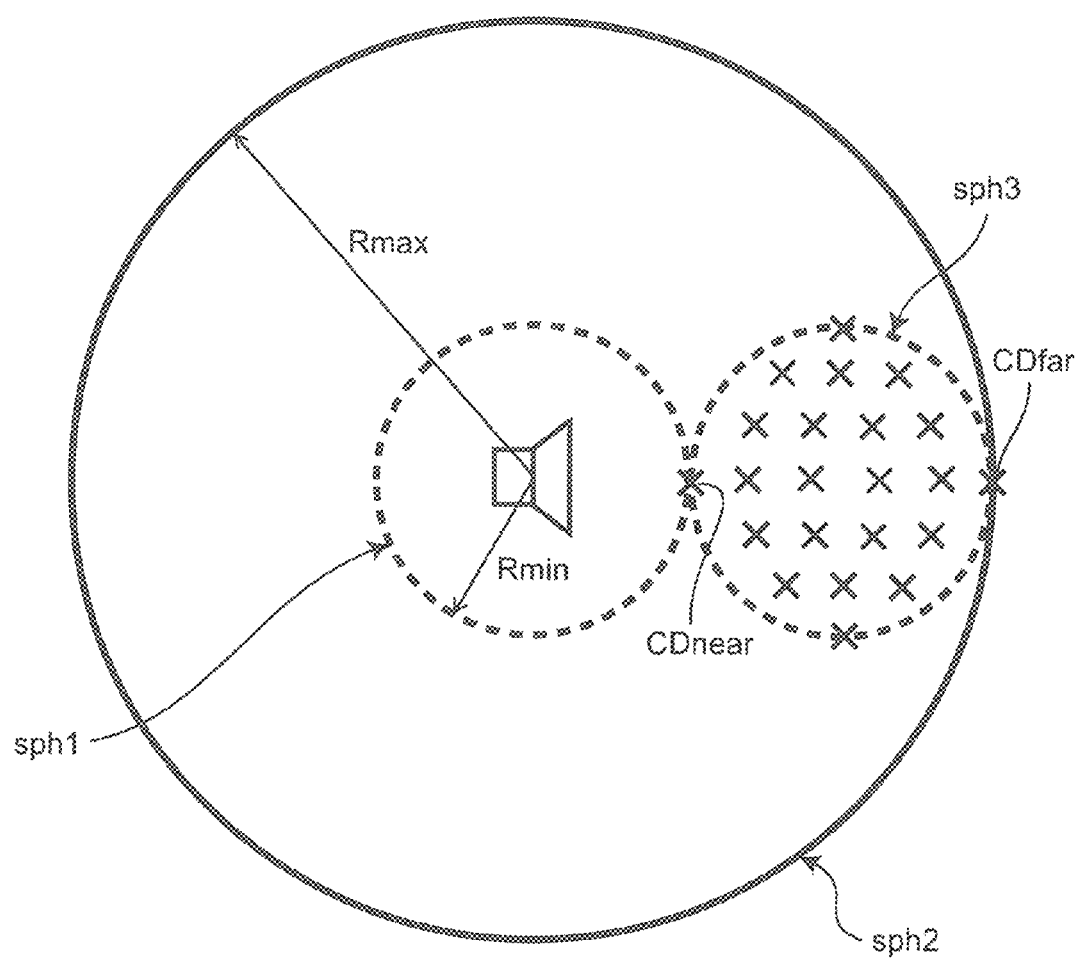
FIG. 25 is a diagram of an example of a distribution of the object position candidates according to the variation 2 of the object position estimating apparatus.

FIG. 25 is a diagram illustrating object position candidates CD (x in the figure), in which a further condition that the microphones as the objects should constitute a spherical-surface shape microphone array is added. In this case, the object position candidates CD are distributed only on a surface of a sphere sph3 that touches the sphere sph1 externally at the candidate $CD_{near}$ and touches the sphere sph2 internally at the candidate $CD_{far}$. In addition, it is extremely highly possible that the microphone that has marked the shortest acoustic wave travel time and the microphone that has marked the longest acoustic wave travel time be located on the candidate $CD_{near}$ and the candidate $CD_{far}$, respectively. Accordingly, it is possible to accelerate the derivation of a configuration approximate solution by selecting a configuration approximate solution candidate including such an arrangement and performing a local-search thereto.

5. Summary

The object position estimating apparatuses according to the embodiments of the present invention are capable of estimating the object positions without measuring a distance between position estimation target objects. The object position estimating apparatuses according to the embodiments of the present invention obtain measurements regarding intervals in the real space between each object and N reference points (N: an integer more than or equal to 3), which can be selected arbitrarily and independently from the positions of the objects, instead of the utilization of the distance between position estimation target objects. Then, the apparatuses generate an N dimensional characteristic vector indicating positional property of the object in the real space based on the obtained measurements, derive a dissimilarity matrix from the characteristic vectors, and derive a configuration of the objects in the (three-dimensional) real space from the dissimilarity matrix. Accordingly, in the embodiments of the present invention, it is not necessary to measure the distances between the position estimation target objects. This makes it possible to easily estimate positions of the objects with accuracy in various situations. Furthermore, in the embodiments of the present invention, by increasing the number of the N reference points (N: an integer more than or equal to 3) selectable arbitrarily and independently from the positions of the objects, the number of dimensions of the characteristic vector indicating the positional property of each object in the real space can be increased.

The embodiments of the present invention are useful as an apparatus for easily and accurately checking an arrangement of microphones and cable connections in a multichannel sound recording system, for example.

The embodiments of the present invention are useful as an apparatus for easily and accurately checking an arrangement of loudspeakers and cable connections in a multichannel sound field reproduction system, for example.

The embodiments of the present invention are capable of estimating positions of a plurality of laptop PCs by means of a microphone and a loudspeaker built into a laptop PC.

The embodiments of the present invention can also be used as an apparatus for easily and accurately checking an arrangement of microphones of a microphone array for voice-recognition and cable connections.

It is to be noted that, in the embodiments described above, the components of the characteristic vector indicating the positional property of an object in the real space are generated as time of the arrival of an acoustic wave from a predetermined reference point. That is, in the embodiments, respective components of the characteristic vector are quantities having a temporal dimension. However, the characteristic vector can be constructed using observed quantities having various dimensions other than the temporal dimension. For example, the characteristic vector can be constructed using quantities on which a shape of reverberant components of a response waveform detected by a microphone is reflected. Namely, the characteristic vector can be constructed based on quantities indicating relative relationship between a direct sound and a reverberant sound within a response waveform. In this case, the dissimilarity matrix may be constructed with data which indicate (dis-)similarity between response waveforms respectively detected by two microphones included as its elements. In this case, the object position estimating apparatus may obtain cross-correlation of respective elements in the dissimilarity matrix, and, based on the obtained cross-correlation, estimate positions of the position estimation target objects in the real space.

Furthermore, the object position estimating apparatus may collect an ambient sound in which a human voice is included by means of M microphones, and based on the amplitude-frequency characteristics of output signals outputted by the respective microphones, generate the characteristic vector. By comparing shapes of the amplitude-frequency characteristics of the output signals from a plurality of microphones (by integrating a difference between the amplitude-frequency characteristics along the frequency axis, for example), it is possible to quantify a relative difference of closeness to a speaker from a plurality of microphones. Alternatively, components of the characteristic vector may be determined based on a ratio of amplitudes of a specific frequency components (a frequency where a formant of a human voice appears) in the amplitude-frequency characteristics of the output signals outputted by respective microphones, for example. Namely, the object position estimating apparatus is capable of determining a component of the characteristic vector by evaluating in a relative manner among the M microphones the closeness between the human who produced a voice and the microphone which has outputted an output signal on the basis of an amplitude of a formant of the human voice extracted from the amplitude-frequency characteristics of the output signal. An approach like this for generating a characteristic vector is beneficial to the position estimation in a room having a rich reverberation property or in a bustle. In addition, it is also beneficial in the case where the M microphones are spread over a relatively wide area in a room.

Furthermore, the object position estimating apparatuses according to the embodiments of the present invention may estimate the object positions using a wave such as light or an electromagnetic wave instead of an acoustic wave. In such a case, the object position estimating apparatus may include a light-emitting element array and a photo-sensitive element array or two sets of antenna-arrays, for example. The apparatus as such can estimate positions of the light-emitting element array (or the photo-sensitive element array or one set of the antenna-array) by detecting wave motions from the light-emitting element array (or the one set of the antenna-arrays) by means of the photo-sensitive element array (or the other set of the antenna-array).

Furthermore, the object position estimating apparatuses according to the embodiments of the present invention may estimate the object positions using a surface-wave propagating over a surface of matter instead of an acoustic wave. In such a case, the object position estimating apparatus may include two sets of transducer arrays which convert electrical energy to vibrational energy, for example. The apparatus as such can estimate positions of one set of the transducer array by detecting surface waves from the one set of the transducer array by means of the other set of the transducer array.

INDUSTRIAL APPLICABILITY

The embodiments of the present invention can be used for checking positions of a plurality of microphones and cable connections at the site of sound recording, for example.

Further, the estimation unit of the object position estimating apparatus may seek an approximate solution of the configuration numerically by means of a full-search or a local-search technique instead of applying the MDS method to a dissimilarity matrix, and estimate the positions in the real space of the M microphones from the configuration approximate solution.

REFERENCE SIGN LIST

1: controller
2: impulse generator (TSP generator)
3: response detector
4: characteristic vector generating unit
5: dissimilarity matrix deriving unit
6: configuration deriving unit (MDS unit)
7: position estimation result output unit
8: estimation unit
10: computer main components
11: CPU
12: ROM
13: RAM
21: HDD
30: user interface unit
31: display 32: keyboard
33: mouse
41: timer
50: audio interface unit
51: audio output unit
52: audio input unit
250: audio interface unit
251: audio output unit
303: amplitude-frequency characteristics calculating unit
304: characteristic vector generating unit (variation)
350: audio interface unit
MCa: microphone array
MCj: j-th microphone
SPa: speaker array
SPi: i-th loudspeaker

The invention claimed is:

1. An object position estimating apparatus which estimates positions of M objects in real space, the M being an integer greater than or equal to 2, comprising:
   a characteristic vector generating unit operable to generate, for each of the M objects, a characteristic vector, the characteristic vector including as its components measurements of the object measured on N scales, the N being an integer greater than or equal to 3, each of the N scales measuring closeness to each of N reference points in the real space;
   a dissimilarity matrix deriving unit operable to calculate a norm between the characteristic vectors of two objects for every pair from among the M objects and to derive a dissimilarity matrix with M rows and M columns, the dissimilarity matrix including as its elements the calculated norms; and
   an estimation unit operable to estimate positions of the M objects in the real space on the basis of the dissimilarity matrix and to output a position estimation result.

2. The object position estimating apparatus according to claim 1, further comprising:
   a timer operable to measure time;
   an audio interface unit including an audio output unit which is operable to output a signal to an external loudspeaker disposed on the reference point and an audio input unit which is operable to input a signal from M external microphones as the M objects;
   a signal generator operable to generate an acoustic wave signal which causes the loudspeaker connected to the audio output unit to emit a predetermined acoustic wave; and
   a response detector operable to input the signal from the M microphones connected to the audio input unit and specify time when the acoustic wave arrives at each of the M microphones with reference to the timer;
   wherein
      the characteristic vector generating unit generates the characteristic vector for each of the M microphones with the use of the time when the microphone responds to the acoustic wave which has been emitted from the loudspeaker at the N reference points as the measurement of the microphone on a time axis as the N scales, and
      the dissimilarity matrix deriving unit calculates a norm between the characteristic vectors of the two microphones for every pair from among the M microphones and derives the dissimilarity matrix including as its elements the calculated norms.

3. The object position estimating apparatus according to claim 2, wherein the signal generator generates the acoustic signal which causes the loudspeaker to emit the acoustic wave having a waveform of a pulse shape.

4. The object position estimating apparatus according to claim 1, further comprising:
   an audio interface unit including an audio input unit which is operable to input a signal from M external microphones as the M objects; and
   an amplitude-frequency characteristics calculating unit operable to input the signal from the M microphones connected to the audio input unit and calculate amplitude-frequency characteristics of the signal from each of the M microphones;
   wherein
      the characteristic vector generating unit generates the characteristic vector based on a formant component of a voice produced at the N reference points, the formant component included in the amplitude-frequency characteristics of the signal from the each of M microphones, and
      the dissimilarity matrix deriving unit calculates a norm between the characteristic vectors of the two microphones for every pair from among the M microphones and derives the dissimilarity matrix including as its elements the calculated norms.

5. The object position estimating apparatus according to claim 2, wherein the estimation unit applies a multidimensional scaling method to the dissimilarity matrix to estimate the positions of the M microphones in the real space and outputs the position estimation result.

6. The object position estimating apparatus according to claim 1, wherein the N is an integer greater than or equal to 10.

7. The object position estimating apparatus according to claim 1, wherein the estimation unit evaluates a suitability for a configuration candidate among a plurality of candidates on a possible configuration of M objects using the dissimilarity matrix, and numerically obtains an approximate solution of the configuration of M objects based on the result of the evaluation to estimate the positions of the M objects in the real space.

8. The object position estimating apparatus according to claim 7, wherein the estimation unit numerically obtains the approximate solution of the configuration of M objects using a local-search technique to estimate the positions of the M objects in the real space.

9. The object position estimating apparatus according to claim 8, wherein the local-search technique is a genetic algorithm.

10. The object position estimating apparatus according to claim 1, further comprising:
    a timer operable to measure time;
    an audio interface unit including an audio output unit which is operable to output a signal to M external loudspeakers as the M objects and an audio input unit which is operable to input a signal from N external microphones disposed on the reference points;
    a signal generator operable to generate an acoustic wave signal which causes the M loudspeakers connected to the audio output unit to emit a predetermined acoustic wave; and
    a response detector operable to input the signal from the N microphones connected to the audio input unit and specify time when the acoustic wave arrives at each of the N microphones with reference to the timer;
    wherein
       the characteristic vector generating unit generates the characteristic vector for each of the M loudspeakers with the use of the time when each of the N microphones disposed at the N reference points responds to the acoustic wave which has been emitted from the loudspeaker as the measurement of the microphone on a time axis as the N scales, and the dissimilarity matrix deriving unit calculates a norm between the characteristic vectors of the two loudspeakers for every pair from among the M loudspeakers and derives the dissimilarity matrix including as its elements the calculated norms.

11. The object position estimating apparatus according to claim 10, wherein the estimation unit applies a multidimensional scaling method to the dissimilarity matrix to estimate positions of the M loudspeakers in the real space and outputs the position estimation result.

12. The object position estimating apparatus according to claim 1, further comprising:

an audio interface unit including an audio input unit which is operable to input a signal from N external microphones disposed at the reference points; and an amplitude-frequency characteristics calculating unit operable to input the signal from the N microphones connected to the audio input unit and calculate amplitude-frequency characteristics of the signal from each of the N microphones;

wherein the characteristic vector generating unit generates the characteristic vector based on a formant component of a voice produced by M humans as the M objects, the formant component included in the amplitude-frequency characteristics of the signal from the each of N microphones, and the dissimilarity matrix deriving unit calculates a norm between the characteristic vectors of the two humans for every pair from among the M humans and derives the dissimilarity matrix including as its elements the calculated norms.

13. The object position estimating apparatus according to claim 12, wherein the estimation unit applies a multidimensional scaling method to the dissimilarity matrix to estimate positions of the M humans in the real space and outputs the position estimation result.

14. An object position estimation method for estimating positions of M objects in real space by an object position estimating apparatus which estimates the positions of the objects, the M being an integer greater than or equal to 2, comprising:

generating, for each of the M objects, a characteristic vector, the characteristic vector including as its components measurements of the object measured on N scales, the N being an integer greater than or equal to 3, each of the N scales measuring closeness to each of N reference points in the real space;

deriving a dissimilarity matrix with M rows and M columns by calculating a norm between the characteristic vectors of two objects for every pair from among the M objects, the dissimilarity matrix including as its elements the calculated norms; and estimating positions of the M objects in the real space on the basis of the dissimilarity matrix and outputting an estimation result.

15. A non-transitory computer-readable recording medium storing an object position estimation program which causes a computer to perform functions of an object position estimating apparatus which estimates positions of M objects in real space, the M being an integer greater than or equal to 2, the program causing the computer to function as:

a characteristic vector generating unit operable to generate, for each of the M objects, a characteristic vector, the characteristic vector including as its components measurements of the object measured on N scales, the N being an integer greater than or equal to 3, each of the N scales measuring closeness to each of N reference points in the real space;

a dissimilarity matrix deriving unit operable to calculate a norm between the characteristic vectors of two objects for every pair from among the M objects and to derive a dissimilarity matrix with M rows and M columns, the dissimilarity matrix including as its elements the calculated norms; and an estimation unit operable to estimate positions of the M objects in the real space on the basis of the dissimilarity matrix and to output an estimation result.

* * * * *